United States Patent
Kita et al.

(10) Patent No.: US 12,159,428 B2
(45) Date of Patent: Dec. 3, 2024

(54) ITEM DETECTION DEVICE, ITEM DETECTION METHOD, AND INDUSTRIAL VEHICLE

(71) Applicants: KABUSHIKI KAISHA TOYOTA JIDOSHOKKI, Kariya (JP); National Institute of Advanced Industrial Science and Technology, Tokyo (JP)

(72) Inventors: Yasuyo Kita, Tsukuba (JP); Nobuyuki Kita, Tsukuba (JP); Ryuichi Takase, Tokyo (JP); Tatsuya Komuro, Tsukuba (JP); Norihiko Kato, Tokyo (JP)

(73) Assignees: KABUSHIKI KAISHA TOYOTA JIDOSHOKKI, Kariya (JP); NATIONAL INSTITUTE OF ADVANCED INDUSTRIAL SCIENCE AND TECHNOLOGY, Tokyo (JP)

(*) Notice: Subject to any disclaimer, the term of this patent is extended or adjusted under 35 U.S.C. 154(b) by 382 days.

(21) Appl. No.: 17/437,483

(22) PCT Filed: Feb. 18, 2020

(86) PCT No.: PCT/JP2020/006347
§ 371 (c)(1),
(2) Date: Sep. 9, 2021

(87) PCT Pub. No.: WO2020/189154
PCT Pub. Date: Sep. 24, 2020

(65) Prior Publication Data
US 2022/0189055 A1  Jun. 16, 2022

(30) Foreign Application Priority Data
Mar. 19, 2019  (JP) ................................ 2019-051675

(51) Int. Cl.
*G06K 9/00* (2022.01)
*B66F 9/075* (2006.01)
(Continued)

(52) U.S. Cl.
CPC .............. *G06T 7/73* (2017.01); *B66F 9/0755* (2013.01); *B66F 9/24* (2013.01); *G01B 11/24* (2013.01);
(Continued)

(58) Field of Classification Search
CPC ........................................... G06T 2207/10016
See application file for complete search history.

(56) References Cited

U.S. PATENT DOCUMENTS

| 5,812,395 A | 9/1998 | Masciangelo et al. |
| 5,938,710 A | 8/1999 | Lanza et al. |

(Continued)

FOREIGN PATENT DOCUMENTS

| JP | H5-157518 A | 6/1993 |
| JP | 2004-038640 A | 2/2004 |

(Continued)

OTHER PUBLICATIONS

International Preliminary Report on Patentability (with translation of Written Opinion) dated Sep. 16, 2021, issued by the International Bureau in application No. PCT/JP2020/006347.

(Continued)

*Primary Examiner* — Hadi Akhavannik
(74) *Attorney, Agent, or Firm* — Sughrue Mion, PLLC

(57) ABSTRACT

There is provided an item detection device that detects an item to be loaded and unloaded and includes an image acquisition unit acquiring a surrounding image obtained by capturing surroundings of the item detection device, an information image creation unit creating an information image, in which information related to a part to be loaded (Continued)

and unloaded in the item has been converted into an easily recognizable state, on the basis of the surrounding image, and a computing unit computing at least one of a position and a posture of the part to be loaded and unloaded on the basis of the information image.

16 Claims, 25 Drawing Sheets

(51) Int. Cl.
  *B66F 9/24* (2006.01)
  *G01B 11/24* (2006.01)
  *G06T 7/73* (2017.01)
  *G06V 10/75* (2022.01)

(52) U.S. Cl.
  CPC .......... *G06V 10/751* (2022.01); *G06V 10/758* (2022.01)

(56) References Cited

U.S. PATENT DOCUMENTS

| | | | | |
|---|---|---|---|---|
| 9,102,055 | B1* | 8/2015 | Konolige | B25J 9/1612 |
| 2014/0067317 | A1* | 3/2014 | Kobayashi | G05D 3/00 |
| | | | | 702/153 |
| 2015/0347840 | A1* | 12/2015 | Iida | G06T 7/593 |
| | | | | 382/103 |
| 2017/0008703 | A1* | 1/2017 | Iijima | B65G 43/08 |
| 2017/0169444 | A1* | 6/2017 | Housholder | G06Q 30/0261 |
| 2017/0316253 | A1 | 11/2017 | Phillips et al. | |
| 2018/0089616 | A1* | 3/2018 | Jacobus | G06K 19/06037 |

FOREIGN PATENT DOCUMENTS

| | | |
|---|---|---|
| JP | 2015-225450 A | 12/2015 |
| KR | 10-2011-0027460 A | 3/2011 |

OTHER PUBLICATIONS

Extended European Search Report dated Apr. 11, 2022 in European Application No. 20774741.1.
Sungmin Byun et al., "Real-Time Positioning and Orienting of Pallets Based on Monocular Vision," International Conference on Tools with Artificial Intelligence, 2008, pp. 505-508 (4 pages total).

* cited by examiner

ITEM DETECTION DEVICE, ITEM DETECTION METHOD, AND INDUSTRIAL VEHICLE

CROSS REFERENCE TO RELATED APPLICATIONS

This application is a National Stage of International Application No. PCT/JP2020/006347 filed on Feb. 18, 2020, claiming priority based on Japanese Patent Application No. 2019-051675 filed on Mar. 19, 2019.

TECHNICAL FIELD

The present invention relates to an item detection device, an item detection method, and an industrial vehicle.

BACKGROUND ART

For example, a technique disclosed in Patent Literature 1 is known as an item detection device according to the related art. The item detection device disclosed in Patent Literature 1 is used to recognize a position where a pallet is present and a position where a fork is inserted when a forklift takes out the pallets stacked in multiple layers and transports the pallets. The item detection device detects the position of the pallet to be loaded and unloaded from a feature part of the item whose relative relationship with respect to the overall contour of the item is known to compute the position and posture of a front surface of the pallet.

CITATION LIST

Patent Literature

Patent Literature 1: Japanese Unexamined Patent Publication No. H5-157518

SUMMARY OF INVENTION

Technical Problem

The technique disclosed in Patent Literature 1 is effective in a case in which the forklift approaches the pallet to be loaded and unloaded from a front direction and then detects the position of the pallet. However, in recent years, it has been required to observe the surroundings not only in the front direction but also from a position away from the pallet, to detect a target pallet, and to calculate the position and posture of the pallet. Before the vehicle body approaches the vicinity of the item to be loaded and unloaded, the item detection device understands the position and posture of the part to be loaded and unloaded in the item. Therefore, the vehicle body can approach the item on a track on which smooth loading and unloading are performed.

Accordingly, an object of the invention is to provide an item detection device, an item detection method, and an industrial vehicle that can detect an item to be loaded and unloaded regardless of a positional relationship with the item.

Solution to Problem

According to an aspect of the invention, there is provided an item detection device that detects an item to be loaded and unloaded. The item detection device includes: an image acquisition unit acquiring a surrounding image obtained by capturing surroundings of the item detection device; an information image creation unit creating an information image, in which information related to a part to be loaded and unloaded in the item has been converted into an easily recognizable state, on the basis of the surrounding image; and a computing unit computing at least one of a position and a posture of the part to be loaded and unloaded on the basis of the information image.

The item detection device includes the image acquisition unit acquiring the surrounding image obtained by capturing the surroundings of the item detection device and the information image creation unit creating the information image, in which the information related to the part to be loaded and unloaded in the item has been converted into the easily recognizable state, on the basis of the surrounding image. For example, in some cases, it is difficult to directly detect the item from the surrounding image showing the aspect of the surroundings of the item detection device, depending on the distance or positional relationship between the item detection device and the item. In contrast, the information image creation unit can create an information image suitable for detecting the part to be loaded and unloaded in the item, on the basis of the surrounding image obtained by capturing the surroundings of the item detection device. In addition, the item detection device includes the computing unit computing at least one of the position and the posture of the part to be loaded and unloaded on the basis of the information image. With this configuration, the computing unit can perform computation through the information image suitable for detecting the part to be loaded and unloaded in the item to calculate at least one of the position and the posture of the part to be loaded and unloaded in a stage before the item detection device approaches the vicinity of the item. Therefore, it is possible to detect the item to be loaded and unloaded regardless of the positional relationship with the item.

The item detection device may further include an adjustment unit adjusting conditions for creating the information image. With this configuration, the adjustment unit can adjust the information image such that the item detection device can easily detect the part to be loaded and unloaded with high accuracy. Therefore, the computing unit can calculate at least one of the position and the posture of the part to be loaded and unloaded with higher accuracy.

In the item detection device, the information image may be an image obtained by projecting information acquired at a position where the surrounding image is acquired onto an arbitrarily set plane. With this configuration, even when the surrounding image is captured from a position where it is difficult to directly detect the part to be loaded and unloaded, the information acquired at the position where the surrounding image is acquired is projected onto the arbitrary plane to create an appropriate information image that makes it easy to detect the part to be loaded and unloaded. Therefore, it is easy to detect the part to be loaded and unloaded, and the computing unit can accurately compute the state of the item.

In the item detection device, the information image creation unit may associate dimensions corresponding to one pixel with the information image, and the computing unit may perform computation on the basis of a relationship between the pixel of the information image and dimensions of the part to be loaded and unloaded. Therefore, since the size of the part to be loaded and unloaded in the information image has a constant correspondence relationship with the actual dimensions, the computing unit can accurately compute the state of the item.

In the item detection device, the computing unit may perform template matching between information related to an edge portion of the part to be loaded and unloaded detected from the information image and actual dimension information of the part to be loaded and unloaded stored in advance in a storage unit. Therefore, the computing unit performs the template matching using the actual dimension information of the part to be loaded and unloaded to accurately compute the state of the item.

The item detection device may further include a feature plane setting unit setting a feature plane onto which features of the part to be loaded and unloaded in the item are projected. The feature plane setting unit may generate a three-dimensional restored shape related to the item and surroundings of the item on the basis of a plurality of the surrounding images captured at different positions and set the feature plane on the basis of the restored shape. The information image creation unit may create the information image using the feature plane. Therefore, the information image creation unit can create an information image that accurately shows the features of the part to be loaded and unloaded in the item even when the state in which the item is placed is unknown. Then, the feature plane is set on the basis of the three-dimensional restored shape of the item and the surroundings of the item. From the above, the computing unit can accurately compute the state of the item using the feature plane.

In the item detection device, the feature plane setting unit may set the feature plane using a moving plane that moves in synchronization with movement of a place where the surrounding image is captured. In this case, the feature plane setting unit can acquire a plurality of images projected onto the moving plane at different positions. Therefore, the feature plane setting unit can generate the three-dimensional restored shape in a short time using the existing method.

In the item detection device, the surrounding image may be an image acquired by a fisheye camera or a wide-angle camera.

Therefore, it is possible to acquire the surroundings of the item detection device as a wide-range surrounding image with a monocular camera.

In the item detection device, the item may be a pallet, the information image may have a pallet candidate portion indicating a region in which the pallet is likely to be present, and the computing unit may have a shape pattern having a first region and a second region that imitate a shape of the pallet, apply the shape pattern to each of the pallet candidate portions, and calculate a degree of uniformity indicating a degree to which the first region and the second region are uniform regions from pixel value histograms in the first region and the second region. A hole portion into which a fork is inserted is formed in a front surface of the pallet which is the part to be loaded and unloaded. Therefore, the second region corresponding to the hole portion is the uniform region in which the pixel value histogram is uniform, and the first region corresponding to a portion other than the hole portion is the uniform region in which the pixel value histogram is uniform. Thus, the computing unit calculates the degree of uniformity indicating the degree to which the first region and the second region are uniform regions and can determine that the possibility of the pallet being present in the pallet candidate unit is high when the degree of uniformity is high. In addition, since the computing unit does not calculate the pixel values of each region of the pallet, but calculates the degree of uniformity of the region which does not depend on the peak position of the histogram, the computing unit can accurately detect the pallet regardless of brightness at the time of imaging.

In the item detection device, the computing unit may calculate the degree of uniformity on the basis of a sum of the number of pixels having pixel values in peak neighborhood regions in the pixel value histograms with respect to the total number of pixels in the first region and the second region. Therefore, the computing unit can compute the degree of uniformity with simple computation.

In the item detection device, the computing unit may further have a similar shape pattern that imitates an object similar to the pallet and may identify the pallet from the pallet candidate portion using the shape pattern and the similar shape pattern. That is, when an object (for example, a white line on a road surface) that is similar to the pallet and is confusable is extracted as the pallet candidate portion, the computing unit calculates the degree of uniformity based on the similar shape pattern for the confusing object and performs magnitude comparison with the degree of uniformity based on the shape pattern to determine the pattern. Therefore, the computing unit can prevent the confusing object from being erroneously detected as the pallet.

In the item detection device, the computing unit may set the pallet candidate portion, the first region, and the second region in a rectangular shape and use an integral image to calculate the pixel value histograms. The outward shape of the front surface of the pallet is rectangular, and the shape of the hole portion is also rectangular. Therefore, the computing unit can perform computation at high speed using the rectangular shape of the pallet and the integral image divided into rectangular regions.

In the item detection device, from a geometric relationship between a position where the surrounding image is acquired and a projection surface onto which information acquired at the position is projected, the adjustment unit may estimate an inclination of a ridge line of a ridge-type peak in a variation in a degree of matching with respect to a variation in a position and a posture of the projection surface, and may search for a local maximum value of the degree of matching on the basis of a direction of the inclination. In this case, the adjustment unit can search for the local maximum value of the degree of matching at high speed, without changing the position and posture of the projection surface over all conditions to calculate the degree of matching.

In the item detection device, the computing unit may correct a template used in the template matching on the basis of an angle formed between a viewing direction from an imaging unit that acquires the surrounding image to the item and the part to be loaded and unloaded. In this case, the computing unit can perform appropriate template matching considering, for example, the R-chamfering of the item in consideration of the angle formed between the viewing direction from the imaging unit to the item and the part to be loaded and unloaded.

According to another aspect of the invention, there is provided an item detection method that detects an item to be loaded and unloaded. The item detection method includes: an image acquisition step of acquiring a surrounding image obtained by capturing surroundings; an information image creation step of creating an information image, in which information related to a part to be loaded and unloaded in the item has been converted into an easily recognizable state, on the basis of the surrounding image; and a computing step of computing at least one of a position and a posture of the part to be loaded and unloaded on the basis of the information image.

According to the item detection method, it is possible to obtain the same operation and effect as those of the item detection device.

According to still another aspect of the invention, there is provided an industrial vehicle including: a vehicle body; an imaging unit capturing an image of surroundings of the vehicle body; and a control unit performing control to detect an item to be loaded and unloaded on the basis of the image acquired by the imaging unit. The control unit includes: an image acquisition unit acquiring a surrounding image obtained by capturing the surroundings of the vehicle body from the imaging unit; an information image creation unit creating an information image, in which information related to a part to be loaded and unloaded in the item has been converted into an easily recognizable state, on the basis of the surrounding image; and a computing unit computing at least one of a position and a posture of the part to be loaded and unloaded on the basis of the information image.

According to the industrial vehicle, it is possible to obtain the same operation and effect as those of the item detection device.

In the industrial vehicle, the control unit may control the position or the posture of the vehicle body on the basis of information related to at least one of a position and a posture of the item. Therefore, the industrial vehicle can smoothly load and unload items.

Advantageous Effects of Invention

According to the invention, it is possible to provide the item detection device, the item detection method, and the industrial vehicle that can detect the item to be loaded and unloaded regardless of the positional relationship with the item.

DESCRIPTION OF EMBODIMENTS

Hereinafter, embodiments of the invention will be described in detail with reference to the drawings.

Figure 1:
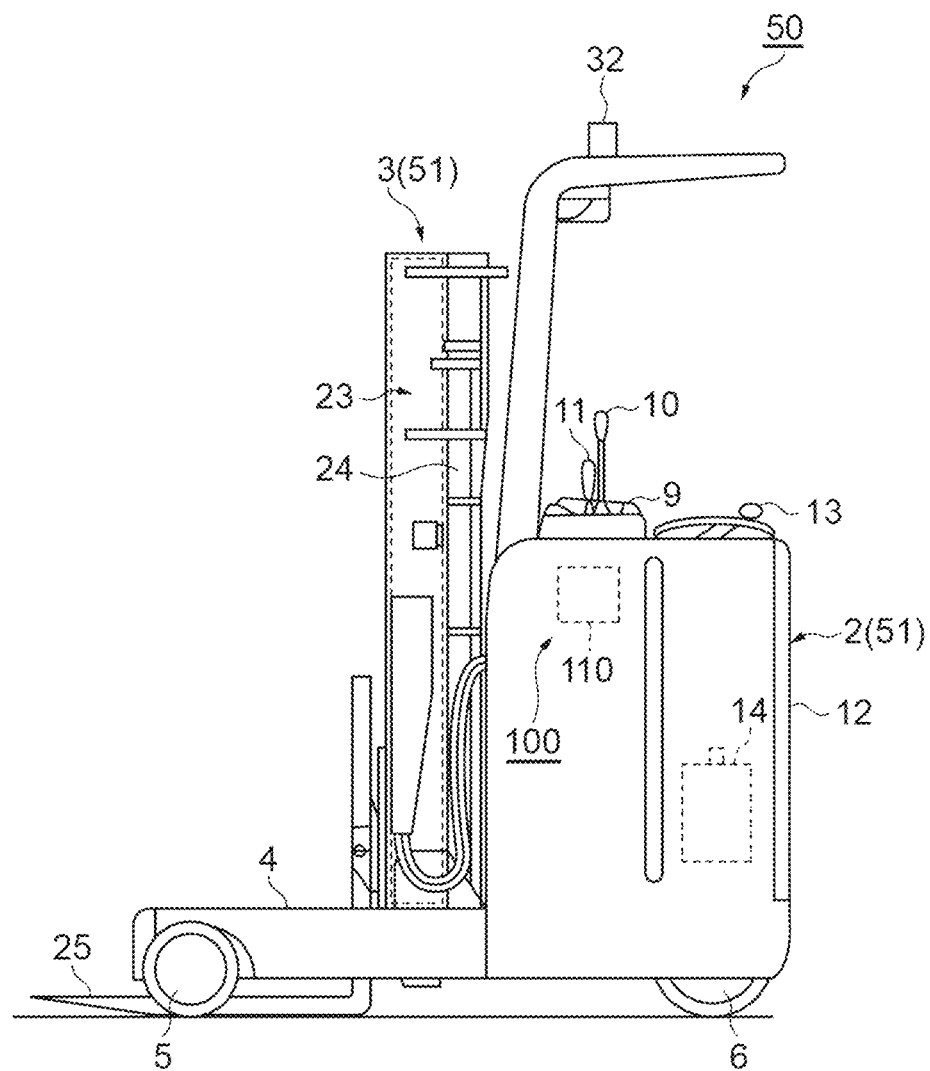
FIG. 1 is a side view illustrating a forklift including an item detection device according to an embodiment of the invention.

FIG. 1 is a side view illustrating an industrial vehicle including an item detection device according to an embodiment of the invention. In addition, description will be made below using "right" and "left". However, it is assumed that the "right" and the "left" correspond to "right" and "left", respectively, when the vehicle is viewed from the rear to the front. As illustrated in FIG. 1, in this embodiment, a forklift 50 is given as an example of the industrial vehicle that loads and unloads items. The forklift 50 includes a vehicle body 51, an imaging unit 32, and an item detection device 100. The forklift 50 includes a moving body 2 and a loading and unloading device 3. The forklift 50 according to this embodiment is a reach-type forklift and can switch between a manual operation by a driver sitting in a driver's seat 12 and an automatic operation by a control unit 110 which will be described below. Alternatively, the forklift 50 may be fully automated by the control unit 110.

The moving body 2 includes a pair of right and left reach legs 4 which extend forward. Right and left front wheels 5 are rotatably supported by the right and left reach legs 4, respectively. A rear wheel 6 is one rear wheel and is a drive wheel that also serves as a steering wheel. A rear portion of the moving body 2 is a standing-type driver's seat 12. An instrument panel 9 in front of the driver's seat 12 is provided with a loading and unloading lever 10 for loading and unloading operations and an accelerator lever 11 for forward and backward operations. In addition, a steering wheel 13 is provided on an upper surface of the instrument panel 9.

The loading and unloading device 3 is provided on the front side of the moving body 2. When a reach lever of the loading and unloading lever 10 is operated, a reach cylinder (not illustrated) is expanded and contracted to move the loading and unloading device 3 in a front-rear direction along the reach leg 4 within a predetermined stroke range. Further, the loading and unloading device 3 includes a two-stage mast 23, a lift cylinder 24, a tilt cylinder (not illustrated), and a fork 25. When a lift lever of the loading and unloading lever 10 is operated, the lift cylinder 24 is expanded and contracted to slide the mast 23 such that the mast 23 is expanded and contracted in the vertical direction. Then, the fork 25 is moved up and down in operative association with the sliding.

Figure 2:
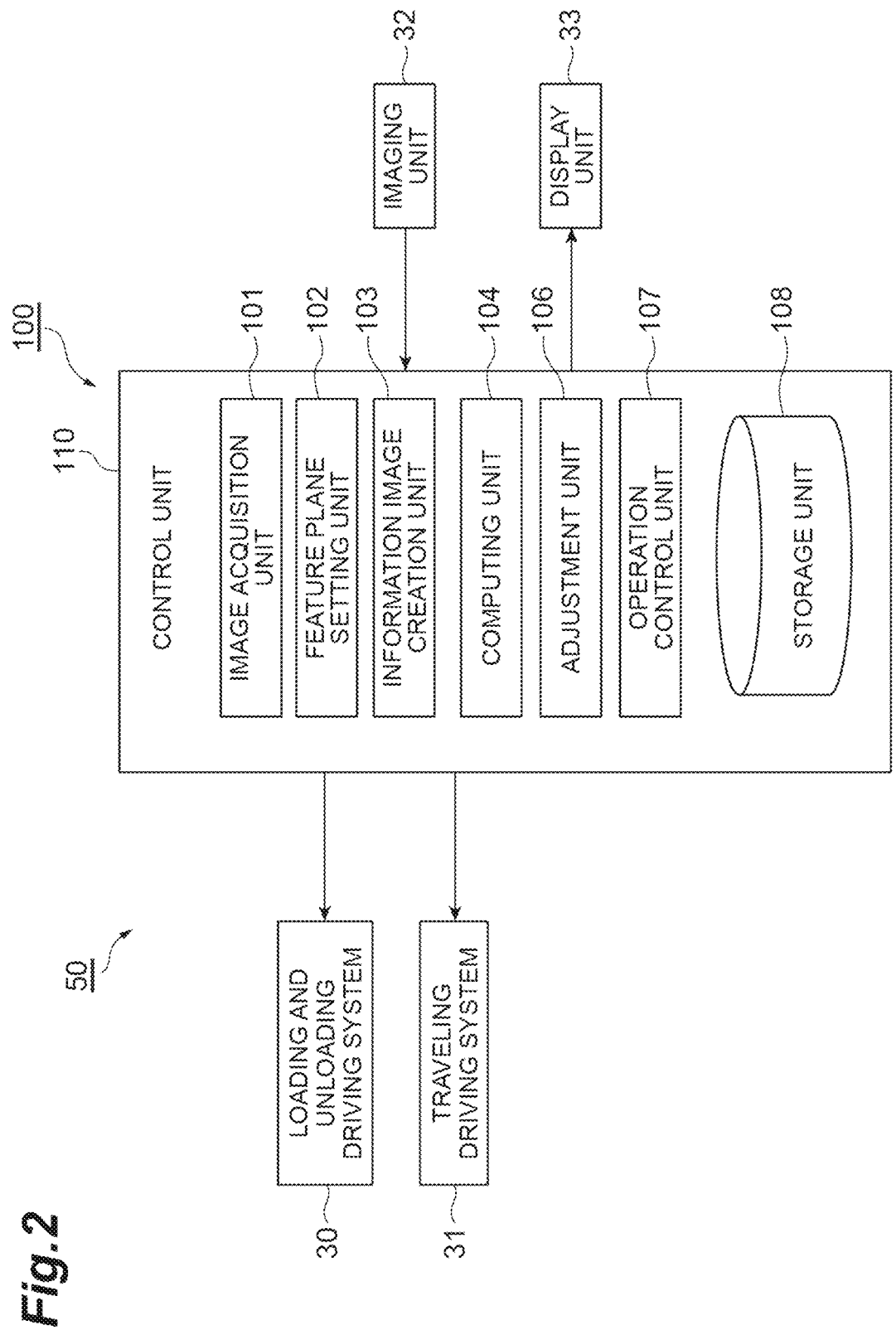
FIG. 2 is a block diagram illustrating the item detection device illustrated in FIG. 1 and components related to the item detection device.

Next, the item detection device 100 of the forklift 50 according to this embodiment will be described in more detail with reference to FIG. 2. FIG. 2 is a block diagram illustrating the item detection device 100 according to this embodiment and components related thereto. As illustrated in FIG. 2, the item detection device 100 includes the control unit 110. The control unit 110 of the item detection device 100 is connected to a loading and unloading driving system 30 and a traveling driving system 31 and transmits control signals to these systems. The loading and unloading driving system 30 is a driving system that generates a driving force for operating the loading and unloading device 3. The traveling driving system 31 is a driving system that generates a driving force for making the moving body 2 travel.

The control unit 110 is connected to the imaging unit 32 and acquires an image captured by the imaging unit 32. The imaging unit 32 captures an image of the surroundings of the vehicle body 51 of the forklift 50. In the example illustrated in FIG. 1, the imaging unit 32 is provided in a ceiling portion of the vehicle body 51, but may be provided at any position as long as it can capture the image of the surroundings of the vehicle body 51. The specific configuration of the imaging unit 32 will be described below. The control unit 110 is connected to a display unit 33 and outputs various kinds of image data to the display unit 33. In addition, in the case of the forklift 50 that can be fully automated by the control unit 110, the display unit 33, the loading and unloading lever 10, the accelerator lever 11, and the steering wheel 13 may not be provided.

The item detection device 100 is a device that detects the item to be loaded and unloaded. In addition, the control unit 110 of the item detection device 100 performs control to automatically operate the forklift 50. The control unit 110 detects the item in a stage before the forklift 50 approaches the item to be loaded and unloaded and understands the position and posture of a part to be loaded and unloaded in the item. Then, the control unit 110 performs control such that the forklift 50 can approach the item so as to smoothly load the item and can insert the fork 25 into the part to be loaded and unloaded.

Figure 3:
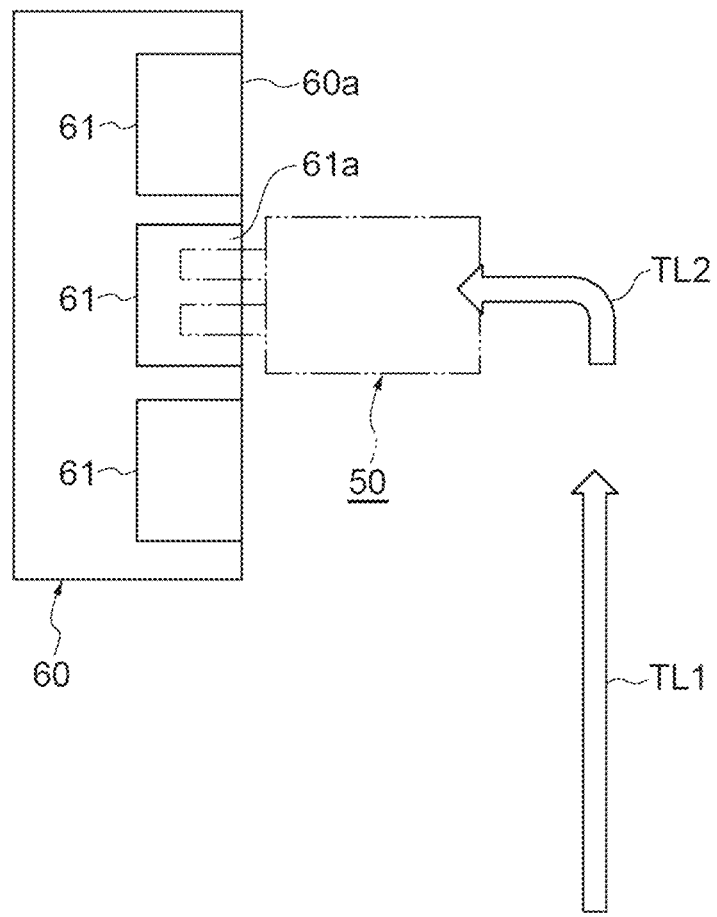
FIG. 3 is a schematic plan view illustrating an operation until the forklift loads a pallet.
Figure 3:
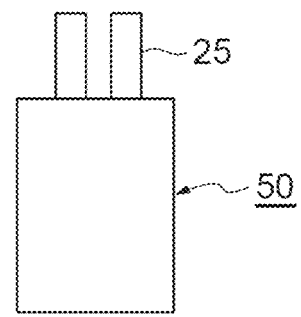

FIG. 3 is a schematic plan view illustrating an operation until the forklift 50 loads a pallet 61. As illustrated in FIG. 3, a case in which the forklift 50 loads the pallet 61 (the item to be loaded and unloaded) disposed on a shelf 60 will be described. The control unit 110 controls the traveling of the forklift 50 such that the forklift 50 approaches the shelf 60. In this case, the control unit 110 performs control such that the forklift 50 approaches the shelf 60 from the side of the shelf 60 (see a track TL1). The control unit 110 performs control such that the forklift 50 turns in front of the shelf 60 (see a track TL2). In this case, the forklift 50 is in a posture facing a front surface 60a of the shelf 60 and a front surface 61a (the part to be loaded and unloaded) of the pallet 61. Then, the control unit 110 performs control such that the forklift 50 linearly approaches the front surface 61a of the pallet 61 on the shelf 60 and inserts the fork 25 into a hole portion formed in the front surface 61a of the pallet 61. When performing this control, the control unit 110 detects the pallet 61 in a stage before turning, that is, a stage in which the forklift 50 travels on the track TL1 and acquires the position and posture of the front surface 61a of the pallet 61. In a case in which a plurality of pallets 61 are disposed on the shelf 60, the control unit 110 checks in advance which pallet 61 to take out in this loading and unloading operation and detects a target pallet 61 from the shelf 60. In addition, the control unit 110 detects the position and posture of the detected pallet 61. The control unit 110 controls the turning position or turning track of the forklift 50 on the basis of the detection result such that the forklift 50 can smoothly insert the fork 25 into the hole portion of the front surface 61a of the pallet 61.

The control unit 110 includes an electronic control unit [ECU] that manages the overall operation of the device. The ECU is an electronic control unit having, for example, a central processing unit [CPU], a read only memory [ROM], a random access memory [RAM], and a controller area network [CAN] communication circuit. In the ECU, for example, a program stored in the ROM is loaded into the RAM, and the CPU executes the program loaded in the RAM to implement various functions. The ECU may be composed of a plurality of electronic units. As illustrated in FIG. 2, the control unit 110 includes an image acquisition unit 101, a feature plane setting unit 102, an information image creation unit 103, a computing unit 104, an adjustment unit 106, an operation control unit 107, and a storage unit 108.

Figure 4:
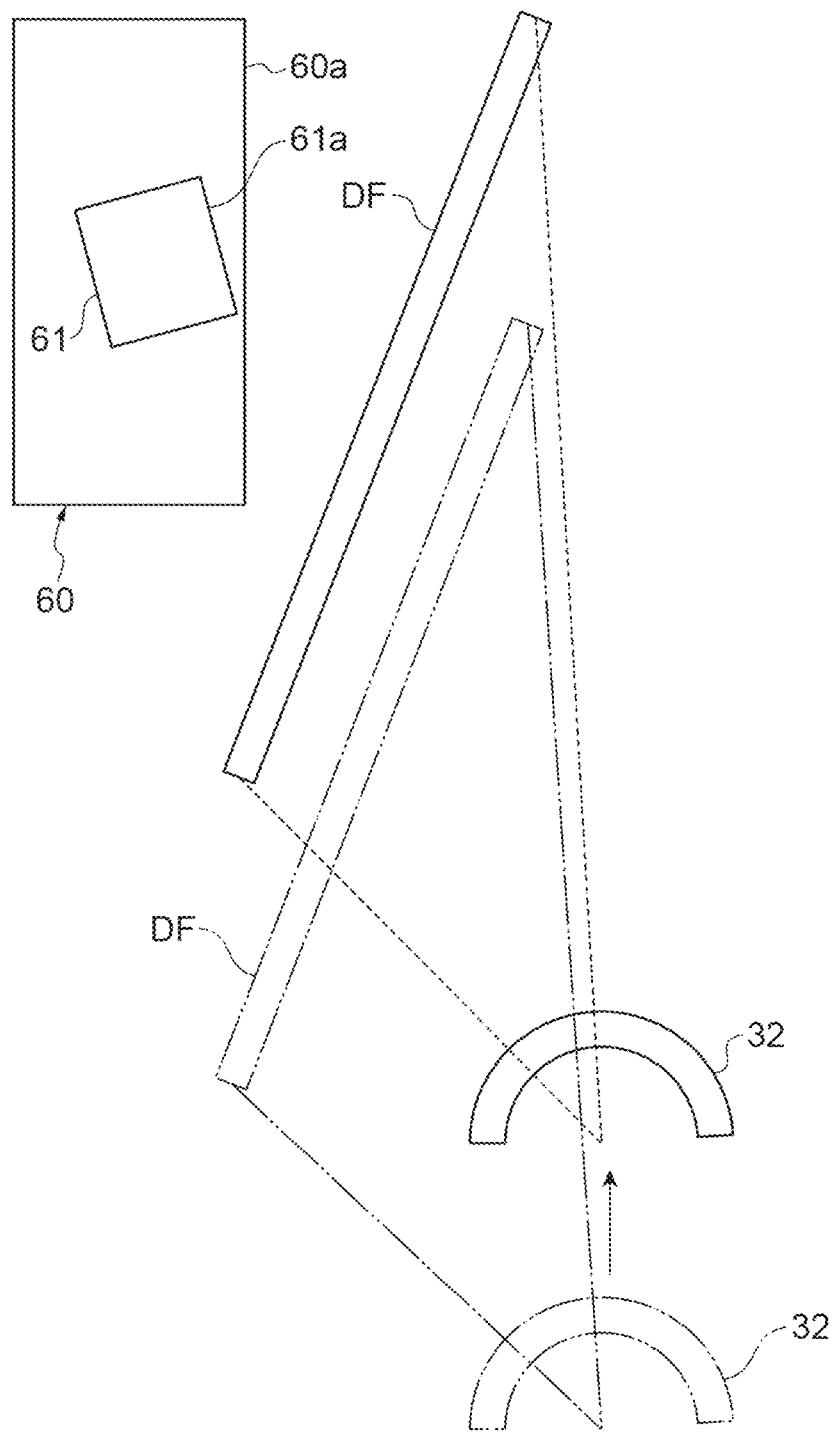
FIG. 4 is a schematic plan view illustrating a time-series positional relationship among an imaging unit, a shelf, and the pallet.

The image acquisition unit 101 acquires a surrounding image obtained by capturing the surroundings of the vehicle body 51 of the forklift 50. The image acquisition unit 101 acquires the surrounding images captured by the imaging unit 32 in time series. The imaging unit 32 performs imaging at predetermined time intervals to capture a plurality of images with the lapse of time. Therefore, a sequence of surrounding images acquired by the image acquisition unit 101 can be treated as a set of images showing the aspect of the surroundings at each time in time series with the lapse of time. The forklift 50 approaches the shelf 60 with the lapse of time. Therefore, as illustrated in FIG. 4, the imaging unit 32 gradually approaches the shelf 60 with the lapse of time. In the surrounding image acquired by the image acquisition unit 101, the shelf 60 and the pallet 61 in the image gradually become larger as the forklift 50 moves forward. In addition, FIG. 4 is a schematic plan view illustrating the time-series positional relationship among the imaging unit 32, the shelf 60, and the pallet 61. In FIG. 4, an inclination angle with respect to the front surface 61a of the pallet 61 and the front surface 60a of the shelf 60 is illustrated so as to be deformed in order to facilitate the understanding of the control content of the control unit 110. The aspect in which the inclination angle is deformed is illustrated in the following drawings.

Figure 5:
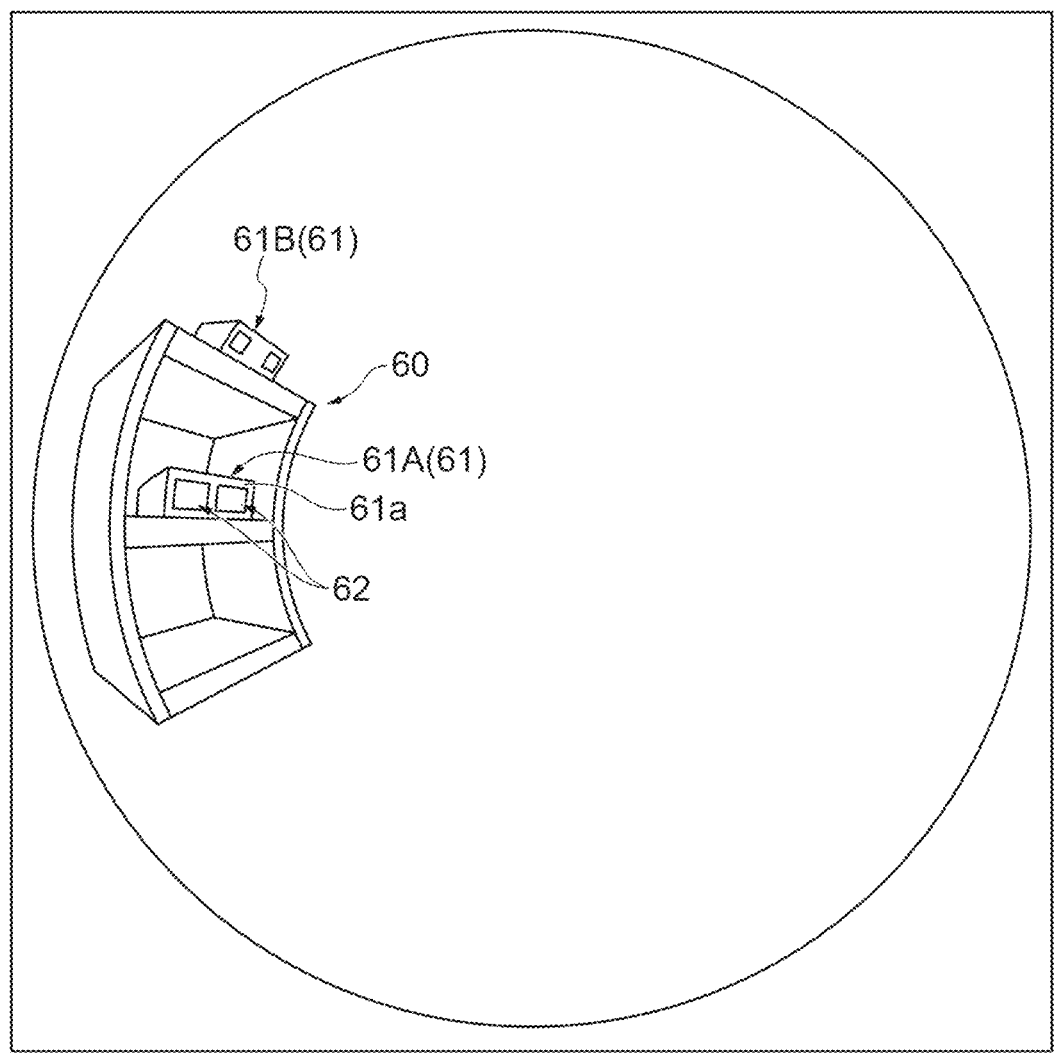
FIG. 5 is a diagram illustrating an example of a surrounding image.

The surrounding image is an image acquired by a fisheye camera. That is, the imaging unit 32 is composed of a fisheye camera. The fisheye camera is a camera that has a general fisheye lens and can capture an image in a wide field of view of about 180° with a monocular lens. FIG. 5 is a diagram illustrating an example of the surrounding image. Since the surrounding image is captured in a wide field of view, as illustrated in FIG. 5, a portion closer to the edge has a larger curvature. Further, in FIG. 5, surrounding structures other than the shelf 60 on which the pallet 61 is disposed are omitted. In addition, only a pallet 61A is disposed in a middle stage of the shelf 60, and only a pallet 61B is arranged in an upper stage of the shelf 60. However, a large number of pallets 61 may be disposed on the shelf 60. In addition, cargoes on the pallets 61A and 61B are omitted. When the forklift 50 is traveling on the track TL1 (see FIG. 3), the shelf 60 is disposed diagonally forward with respect to the imaging unit 32. Further, the front surface 60a of the shelf 60 and the front surface 61a of the pallet 61 are disposed so as to spread substantially in parallel to the traveling direction of the imaging unit 32. In the surrounding image, the shelf 60 and the pallet 61 are displayed in a state in which they are curved toward the edge.

In addition, the lens of the camera constituting the imaging unit 32 is not limited to the fisheye lens. The imaging unit 32 may have any lens as long as it has an angle of view sufficient to acquire the image of the pallet 61 at both the position where the forklift 50 is away from the shelf 60 and the position where the forklift 50 is close to the shelf 60. That is, the imaging unit 32 may be a wide-field camera that can simultaneously capture the front and side aspects of the forklift 50. In addition, the imaging unit 32 may capture an image in a wide field of view, and a wide-angle camera may be adopted. Further, for the imaging unit 32, a plurality of cameras pointed in a plurality of directions may be combined to capture a wide-field image.

The feature plane setting unit 102 sets a feature plane SF (see FIGS. 7 and 9) onto which the features of the front surface 61a of the pallet 61 are projected. The feature plane SF will be described in detail below.

The information image creation unit 103 creates an information image in which information related to the front surface 61a of the pallet 61 has been converted into an easily recognizable state on the basis of the surrounding image. The information image creation unit 103 creates the information image using the feature plane SF. As described above, the surrounding image that can be directly acquired from the imaging unit 32 is an image in which the shelf 60 and the pallet 61 are shown so as to be curved as illustrated in FIG. 5. Further, in the surrounding image, the sizes of the shelf 60 and the pallet 61 vary depending on the distance from the imaging unit 32. Therefore, it is difficult to directly detect the pallet 61 to be loaded and unloaded from the surrounding image. For this reason, the information image creation unit 103 creates the information image in which information, such as the shape features and dimensional features of the front surface 61a of the pallet 61 to be loaded and unloaded, is clearly shown such that the front surface 61a of the pallet 61 is easily detected. A state in which the information related to the front surface 61a of the pallet 61 is easily recognized as described above means a state in which a computation load when the information is acquired from the information image by an image recognition process can be less than at least a computation load when the information is acquired from the surrounding image by image recognition process. In addition, in a case in which the computation load is the same, when the information is acquired from the information image, the information can be acquired more accurately than when the information is acquired from the surrounding image.

Here, the information image can most accurately show the shape features and dimensional features of the front surface 61a when the feature plane SF is set for the front surface 61a of the pallet 61 to be loaded and unloaded (the principle will be described below).

However, in a stage in which the pallet 61 to be loaded and unloaded is not specified, it is difficult to set the feature plane SF for the front surface 61a of the pallet 61. Therefore, the feature plane setting unit 102 sets the feature plane SF for a part of a surrounding structure that can approximate the front surface 61a of the pallet 61. Here, the feature plane SF is set for the front surface 60a of the shelf 60 on the basis of the fact that the front surface 61a of each pallet 61 is disposed so as to be substantially matched with the front surface 60a of the shelf and to be substantially parallel to the front surface 60a at a close position, as illustrated in FIG. 7(a).

Figure 7:
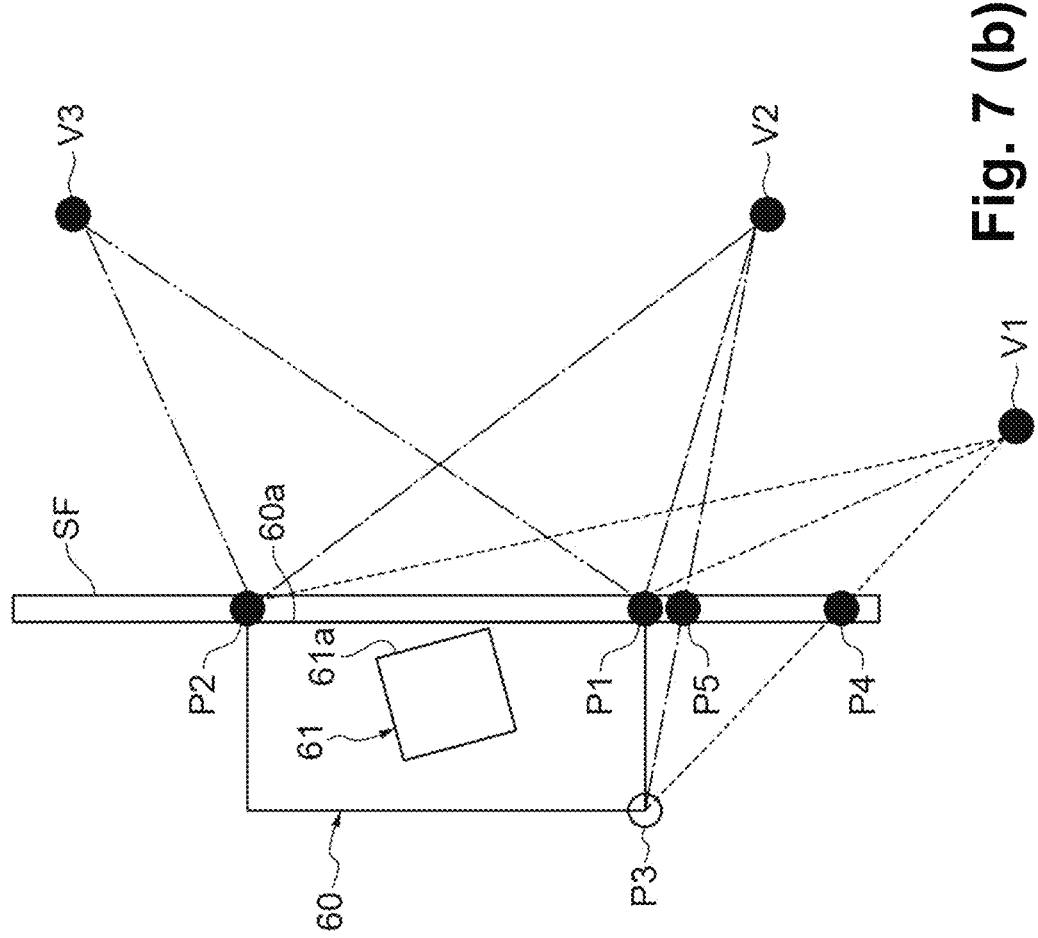
FIG. 7(a) is a perspective view illustrating an aspect in which a feature plane is set for a shelf.
FIG. 7(b) is a schematic plan view illustrating a positional relationship between the feature plane and a plurality of viewpoints V1, V2, and V3.
Figure 7:
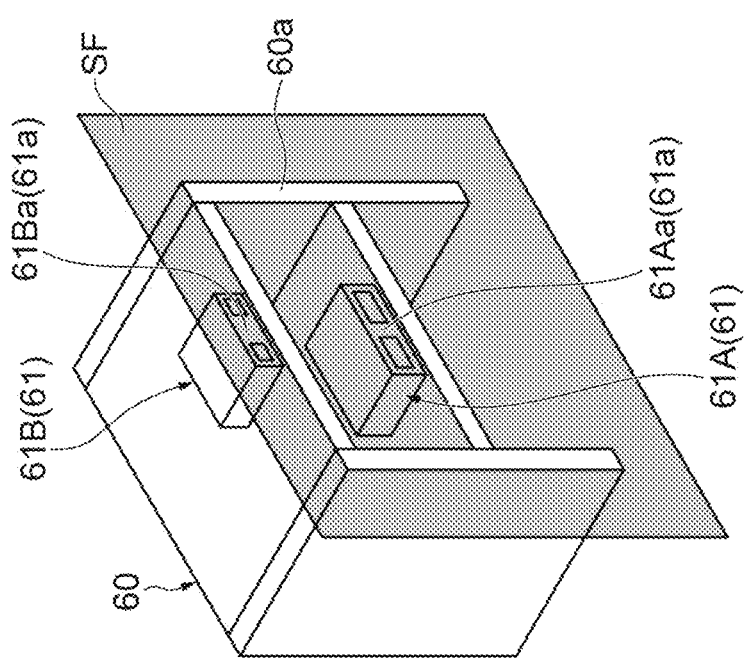
Figure 8:
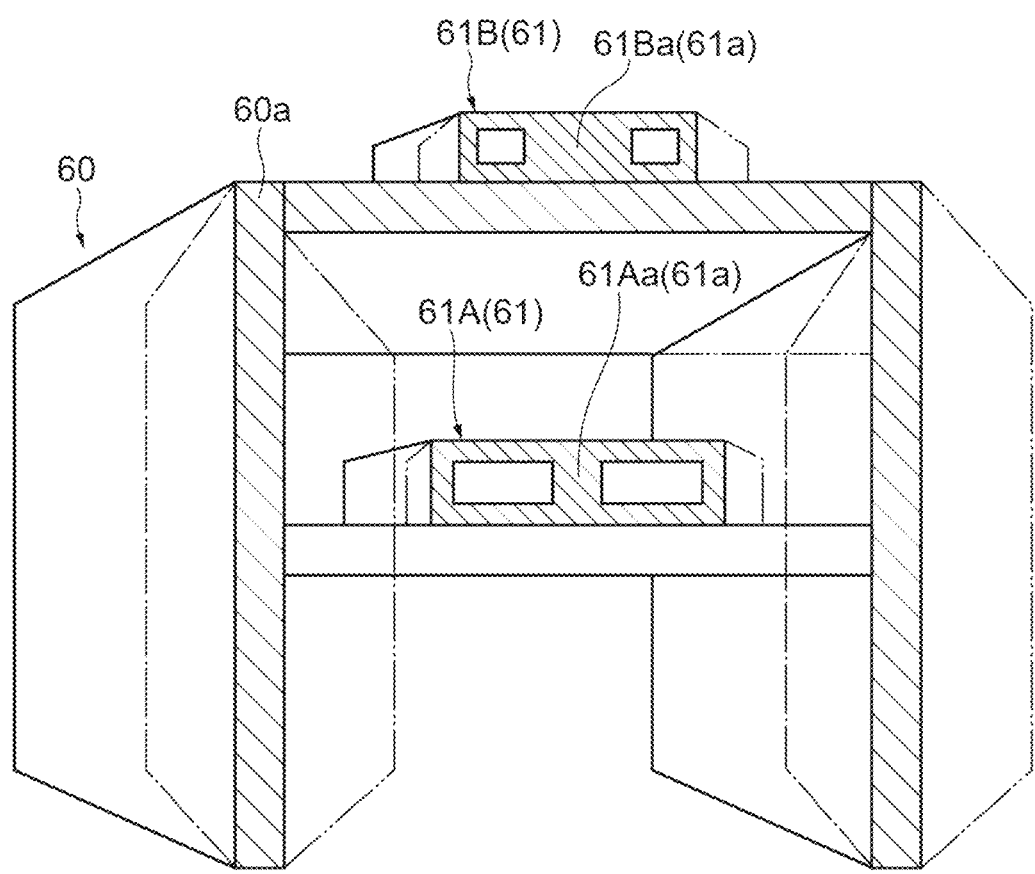
FIG. 8 illustrates an information image created using the feature plane.

The feature plane SF and the information image will be described in detail with reference to FIGS. 7 and 8. FIG. 7(a) is a perspective view illustrating an aspect in which the feature plane SF is set for the shelf 60. FIG. 7(b) is a schematic plan view illustrating the positional relationship between the feature plane SF and the plurality of viewpoints V1, V2, and V3. FIG. 8 illustrates the information image created using the feature plane SF.

The feature plane SF is a planar projection plane that is virtually set in a three-dimensional space in order to create the information image. In addition, the position and posture related to the feature plane SF are information that is known in the stage of setting. The information image is an image in which information acquired at the position where the surrounding image is acquired has been converted into an easily recognizable state. The information acquired at the position where the surrounding image is acquired includes information such as the position and size of each part of the shelf 60 and the pallet 61 when viewed from the position. The information image creation unit 103 projects the surrounding image onto the feature plane SF to create the information image. Since the image acquisition unit 101 acquires a plurality of surrounding images in time series, the information image creation unit 103 can also create a plurality of information images whose number is equal to the number of surrounding images.

The feature plane SF is a projection plane onto which the features of the front surface 61a of the pallet 61 are projected. Therefore, the feature plane SF is set such that the features of the front surface 61a of the pallet 61 are shown in the information image projected onto the feature plane SF. That is, the feature plane SF is a projection plane that is set at a position where the features of the front surface 61a of the pallet 61 can be accurately shown. In the information image of the front surface 61a of the pallet 61 projected onto the feature plane SF set in this way, information indicating the features of the front surface 61a is shown in an aspect in which it can be easily recognized by the image recognition process. The features of the front surface 61a mean the unique appearance features of the front surface 61a that can be distinguished from other items in the image. The information indicating the features of the front surface 61*a* is, for example, shape information or dimensional information that can specify the front surface 61*a*.

For example, the front surface 61*a* of the pallet 61 has a rectangular shape that extends in a width direction and is characterized by having two hole portions 62. Since the front surface 61*a* and the hole portions 62 of the pallet 61 are displayed so as to be distorted in the surrounding image (see FIG. 5), it is difficult to specify the shapes of the front surface 61*a* and the hole portions 62, to check the dimensions thereof, and to detect the front surface 61*a* and the hole portions 62 as features using the image recognition process. In contrast, in the image projected onto the feature plane SF, the shapes of the front surface 61*a* and the hole portions 62 of the pallet 61 are accurately shown without being deformed (see FIG. 11(*a*)). In addition, in the image projected onto the feature plane SF, dimensions L1, L2, and L3 for specifying the front surface 61*a* of the pallet 61 are shown in an aspect in which they can be measured (a specific method for specifying the dimensions will be described below). In the image projected onto the feature plane SF, the features of the front surface 61*a* of the pallet 61 are accurately shown. That is, in the image projected onto the feature plane SF, the information indicating the features of the front surface 61*a* is displayed in a form in which the information is converted so as to be easily recognizable by the image recognition process. As described above, the feature plane setting unit 102 sets the feature plane SF at a position where the information indicating the features of the front surface 61*a* of the pallet 61 can be easily recognized.

Here, the information image can most accurately show the shape features and dimensional features of the front surface 61*a* when the feature plane SF is set for the front surface 61*a* of the pallet 61 to be loaded and unloaded. However, in a stage in which the pallet 61 to be loaded and unloaded is not specified (when the state of the item is unknown), it is difficult to set the feature plane SF for the front surface 61*a* of the pallet 61. Therefore, the feature plane setting unit 102 sets the feature plane SF for a part of a structure around the pallet 61. As illustrated in FIG. 7(*a*), the feature plane setting unit 102 sets the feature plane SF for the front surface 60*a* of the shelf 60. The front surface 61*a* of each pallet 61 is disposed so as to be substantially matched with the feature plane SF set for the front surface 60*a* and to be substantially parallel to the front surface 60*a* at a close position. Therefore, the information image projected onto the feature plane SF set for the front surface 60*a* of the shelf 60 is an image that sufficiently shows the features of the front surface 61*a* of each pallet 61.

As illustrated in FIG. 7(*b*), an object that is present on the feature plane SF is projected at a position where the object is actually present in the image projected from any viewpoint. Specifically, one end portion P1 and the other end portion P2 of the front surface 60*a* of the shelf 60 are present on the feature plane SF. Therefore, the positions of the end portions P1 and P2 in the information image are constant regardless of which of the viewpoints V1, V2, and V3 the end portions are projected from. In contrast, an end portion P3 of a rear surface of the shelf 60 is projected at the position of a projection point P4 on the feature plane SF when it is projected from the viewpoint V1. Then, the end portion P3 is projected at the position of a projection point P5 different from the projection point P4 on the feature plane SF when it is projected from the viewpoint V2. As seen from the above, the position of an object, which is not present on the feature plane SF in the three-dimensional space, in the information image changes depending on the viewpoint. On the other hand, the actual shape features and dimensional features of an object, which is present on the feature plane SF in the three-dimensional space, are maintained in the information image regardless of the viewpoint. In addition, in practice, the imaging unit 32 does not move up to the position of the viewpoint V3 passing the shelf 60. However, the viewpoint V3 is illustrated for the sake of explanation.

In FIG. 8, a hatched portion is a portion that is present on the feature plane SF or at a position close to the feature plane SF. The position of the portion in the information image is substantially constant even when the viewpoint changes. Here, the sizes and positions of the front surface 60*a* of the shelf 60 and front surfaces 61Aa and 61Ba of the pallets 61A and 61B in the information image are constant regardless of the viewpoint. Here, the information image creation unit 103 associates dimensions corresponding to one pixel with the information image. That is, it is uniquely determined how large the size of one pixel in the information image is as the actual dimensions. Therefore, the sizes of the front surface 60*a* of the shelf 60 and the front surfaces 61Aa and 61Ba of the pallets 61A and 61B are constant in the information image regardless of which of the viewpoints the information image is projected from. On the other hand, the position of a portion, which is not present on the feature plane SF in the three-dimensional space, in the information image varies as the viewpoint changes. For example, among portions other than the hatched portion in FIG. 8, a portion represented by a solid line shows an aspect when viewed from the viewpoint V1, a portion represented by a one-dot chain line shows an aspect when viewed from the viewpoint V2, and a portion represented by a two-dot chain line shows an aspect when viewed from the viewpoint V3.

Figure 6:
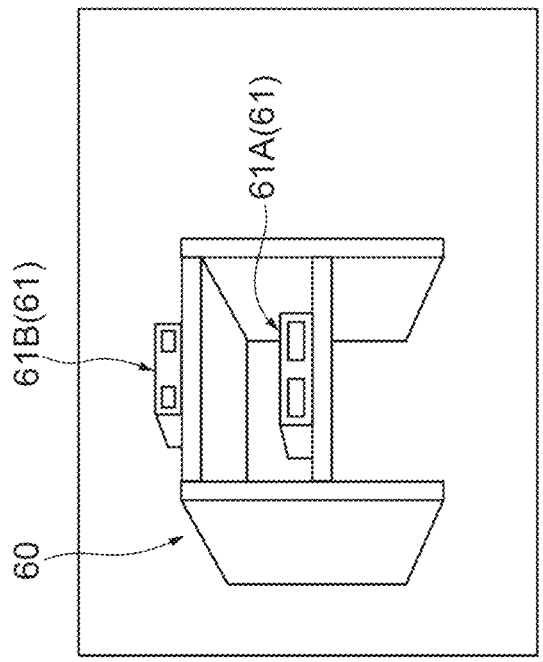
FIG. 6(a) illustrates a projection image acquired at the position of the imaging unit represented by a two-dot chain line in FIG. 4.
FIG. 6(b) illustrates a projection image acquired at the position of the imaging unit represented by a solid line in FIG. 4.
Figure 6:
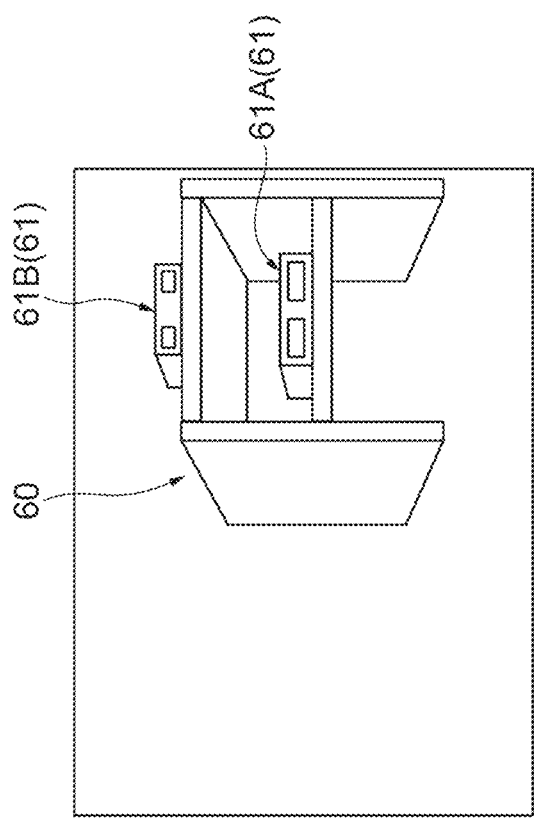

Next, how the feature plane setting unit 102 sets the feature plane SF for the front surface of the shelf 60 will be described with reference to FIGS. 4 and 6. As illustrated in FIG. 4, the feature plane setting unit 102 uses a moving plane DF that moves in synchronization with the movement of the place where the surrounding image is captured as the projection plane. The movement of the place where the surrounding image is captured is the movement of the imaging unit 32 associated with the movement of the forklift 50. The moving plane DF is disposed a predetermined distance in front of the imaging unit 32 and is set in a direction in which it faces the front surface 60*a* of the shelf 60. In addition, the moving plane DF is set so as to be inclined with respect to the front surface 60*a* of the shelf 60 in order to be clearly distinguished from the feature plane SF on the drawings. However, the moving plane DF may not be inclined. The feature plane setting unit 102 acquires a projection image when the shelf 60 and the pallet 61 are projected onto the moving plane DF as viewed from the imaging unit 32. Since the imaging unit 32 is moved with the lapse of time, the feature plane setting unit 102 can acquire a plurality of projection images projected onto the moving plane DF in time series. Therefore, each of the surrounding images captured continuously in time series is acquired corresponding to the position at the time when each surrounding image is captured. FIG. 6(*a*) illustrates a projection image acquired at the position of the imaging unit 32 represented by a two-dot chain line in FIG. 4. FIG. 6(*b*) illustrates a projection image acquired at the position of the imaging unit 32 represented by a solid line in FIG. 4. As illustrated in FIG. 6, the shelf 60 and the pallets 61A and 61B in the projection image move in the projection image with the movement of the imaging unit 32. The plurality of projection images can be used to acquire information related to a three-dimensional shape, as in a known method for restoring a three-dimensional shape from a plurality of images captured at different positions. In addition, the plurality of images used to restore the three-dimensional shape may be captured at different positions and are not limited to a plurality of surrounding images captured in time series. For example, in a case in which a plurality of cameras are used, the three-dimensional shape may be restored on the basis of the geometric relationship between the positions of the cameras in two or more images captured at the same time.

The feature plane setting unit 102 generates a three-dimensional restored shape of the pallet 61 and the shelf 60 on the basis of the plurality of projection images. The feature plane setting unit 102 generates the three-dimensional restored shape from the plurality of projection images obtained using the time-series surrounding images and the moving plane DF. The feature plane setting unit 102 restores the three-dimensional shape of the shelf 60 and the pallet 61 with a known method using structure from motion [SFM]. Further, the feature plane setting unit 102 sets the feature plane SF on the basis of the restored shape. The feature plane setting unit 102 calculates an equation of the three-dimensional plane of the front surface 60a of the shelf 60 in the restored shape with a known plane detection method using random sampling consensus [RANSAC] and sets the equation for the feature plane SF.

Figure 9:
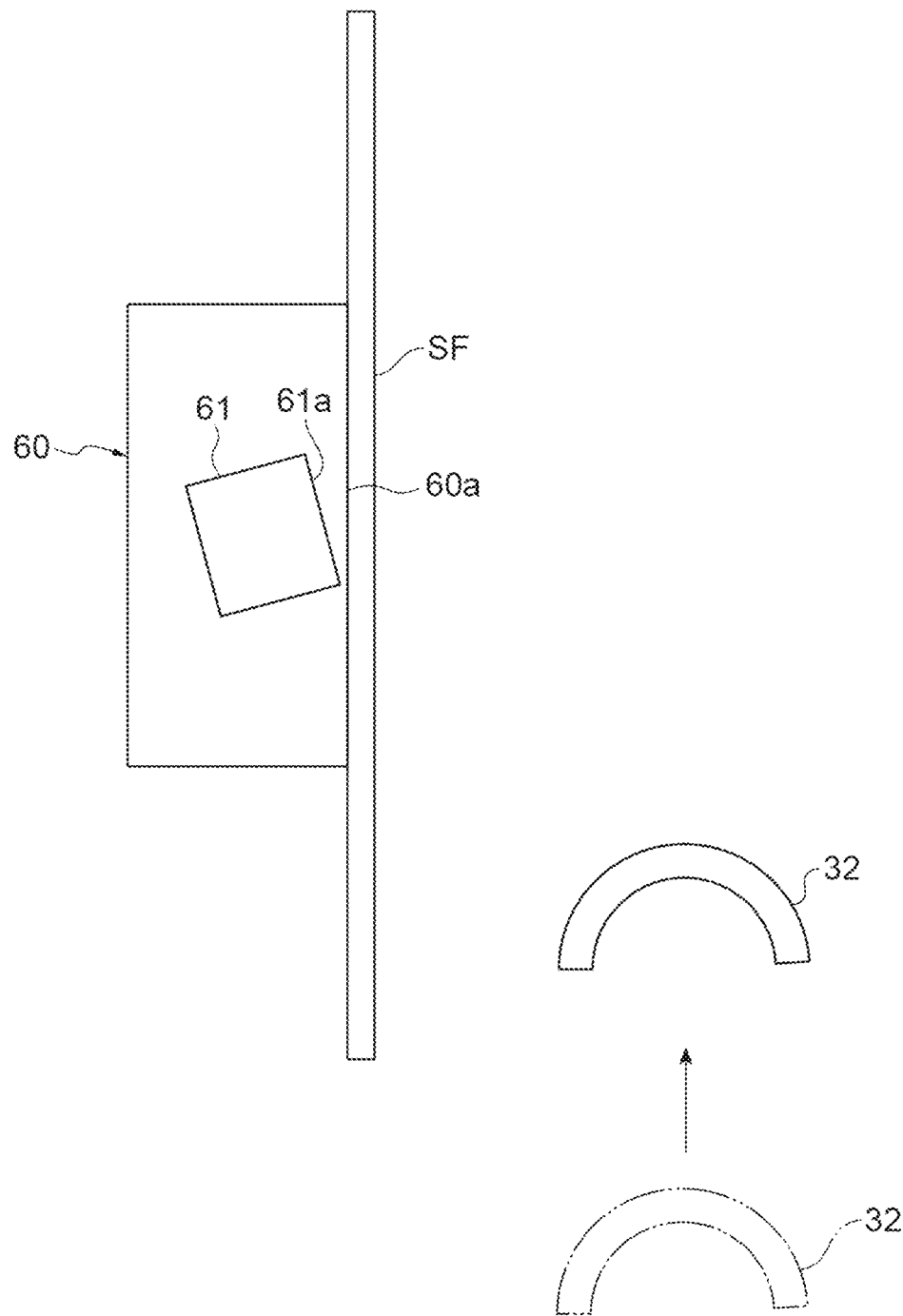
FIG. 9 is a schematic plan view illustrating the time-series positional relationship among the imaging unit, the shelf, and the pallet.
Figure 10:
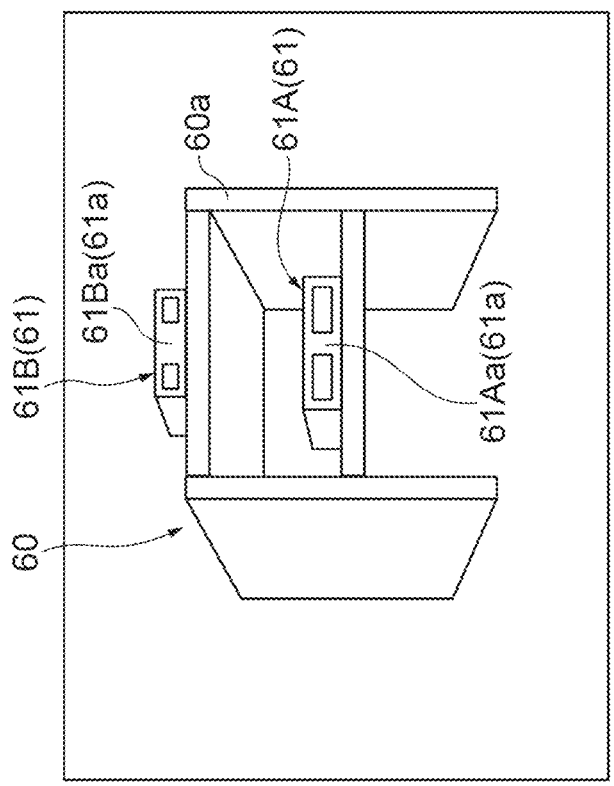
FIG. 10(a) illustrates an information image obtained when the imaging unit is present at the position represented by a two-dot chain line in FIG. 9.
FIG. 10(b) illustrates an information image obtained when the imaging unit is present at the position represented by a solid line in FIG. 9.
Figure 10:
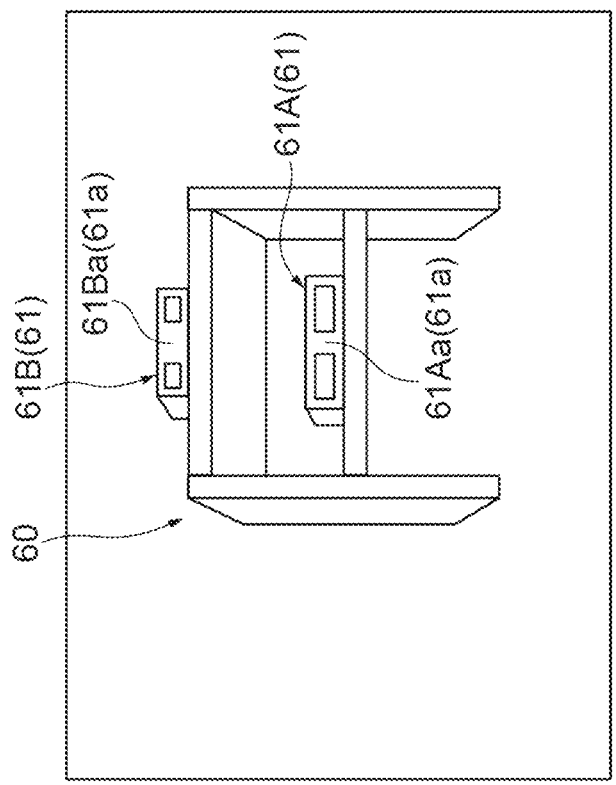

After the feature plane setting unit 102 sets the feature plane SF as described above, the information image creation unit 103 projects the information obtained at the position where the surrounding image is acquired onto the feature plane SF to create an information image. FIG. 9 is a schematic plan view illustrating the time-series positional relationship among the imaging unit 32, the shelf 60, and the pallet 61. As illustrated in FIG. 9, the feature plane SF is always set at the position of the front surface 60a of the shelf 60 regardless of the position of the imaging unit 32. Therefore, the information image creation unit 103 can create an information image illustrated in FIG. 10. FIG. 10(a) illustrates an information image obtained when the imaging unit 32 is present at the position represented by a two-dot chain line in FIG. 9. FIG. 10(b) illustrates an information image obtained when the imaging unit 32 is present at the position represented by a solid line in FIG. 9. In the information image illustrated in FIG. 10(a) and the information image illustrated in FIG. 10(b), the front surface 60a of the shelf 60 on the feature plane SF and the front surfaces 61Aa and 61Ba of the pallets 61A and 61B in the vicinity of the feature plane SF are shown at almost the same position with almost the same size.

The computing unit 104 detects the pallet 61 to be loaded and unloaded on the basis of the information image. Further, the computing unit 104 computes the position and posture of the front surface 61a of the pallet 61 to be loaded and unloaded on the basis of the information image. Here, the "position" and "posture" of the front surface 61a include the meaning of both the relative three-dimensional position and posture (the position and posture in a camera coordinate system) of the front surface 61a with respect to the imaging unit 32 at a certain point of time and the three-dimensional position and posture of the front surface 61a in an absolute coordinate system. In this embodiment, a case in which the computing unit 104 calculates a relative position and posture will be described. That is, when computing the position and posture from a certain information image, the computing unit 104 computes the distance of a reference point of the front surface 61a from the place where the surrounding image which is the source of the information image is captured. The reference point of the front surface 61a may be set anywhere and may be set at the end or center position of the front surface 61a. Further, the computing unit 104 computes the angle of the front surface 61a with respect to an optical axis of the imaging unit 32 when the surrounding image is captured. When the computing unit 104 knows the position and posture of the imaging unit 32 in the absolute coordinate system, it can compute the position and posture of the front surface 61a in the absolute coordinate system.

The computing unit 104 performs computation related to the pallet 61 on the basis of the relationship between the pixels of the information image and the dimensions of the front surface 61a of the pallet 61. That is, in the information image, the actual dimensions corresponding to one pixel are uniquely determined. Therefore, the computing unit 104 can detect the front surface 61a by reading the actual dimension information of the front surface 61a of the pallet 61 to be loaded and unloaded from the storage unit 108 and extracting an object matched with the actual dimension information from the information image.

Figure 11:
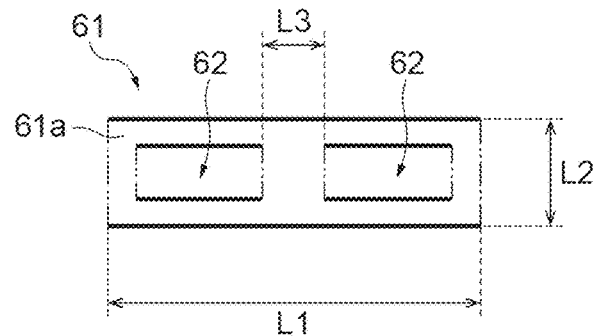
FIG. 11(a) illustrates an example of actual dimension information of the pallet.
FIG. 11(b) is a diagram illustrating an aspect of an information image when template matching is performed.
Figure 11:
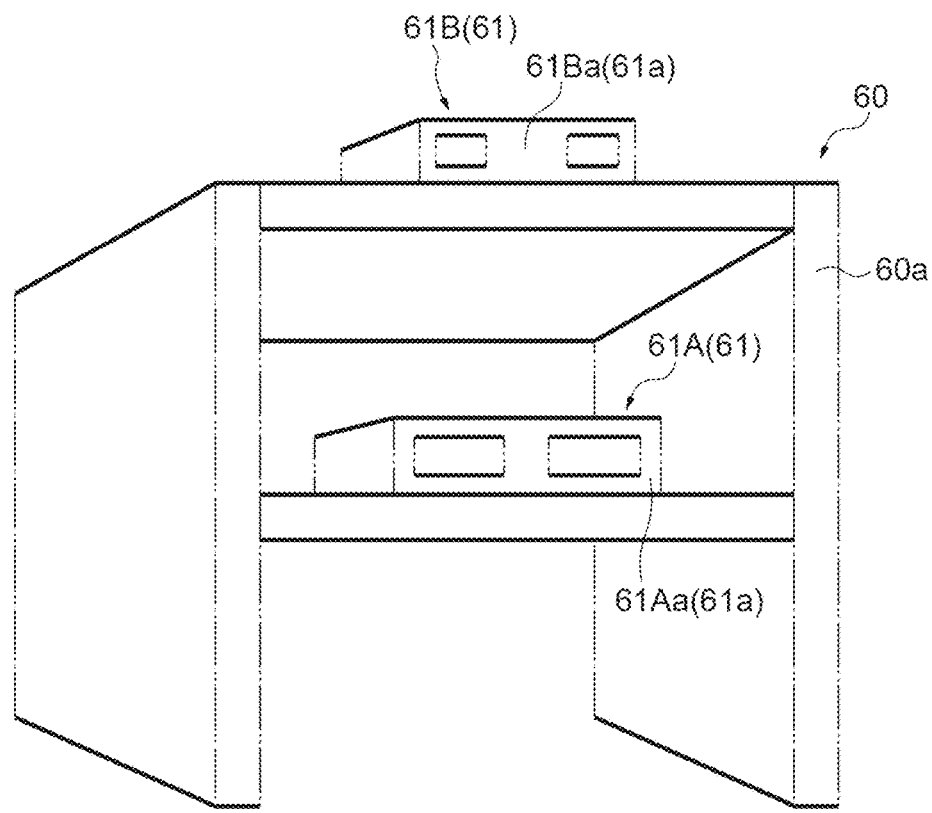

The computing unit 104 performs template matching between information related to an edge portion of the front surface 61a of the pallet 61 detected from the information image and the actual dimension information of the front surface 61a stored in advance in the storage unit 108. FIG. 11(a) illustrates an example of the actual dimension information of the pallet 61. FIG. 11(b) is a diagram illustrating an aspect of the information image when the template matching is performed. As illustrated in FIG. 11(a), the actual dimension information is an edge template that is set on the basis of the dimensional relationship of portions corresponding to the edge portions of the actual pallet 61 and includes, for example, a width dimension L1 of the front surface 61a of the pallet 61, a height dimension L2 of the front surface 61a, and a dimension L3 between the hole portions 62. When performing the template matching, the computing unit 104 detects the edge portion of the front surface 61a of the pallet 61 as an object to be detected as illustrated in FIG. 11(a) and detects an edge portion of an object, such as a structure, which is present in the information image as illustrated in FIG. 11(b). The computing unit 104 detects the edge portion in the image using a known image processing method. In this case, the computing unit 104 distinguishes between an edge portion extending in the horizontal direction and an edge portion extending in the vertical direction. In FIG. 11, the edge portion extending in the horizontal direction is represented by a solid line, and the edge portion extending in the vertical direction is represented by a two-dot chain line. The computing unit 104 scans a template of the front surface 61a of the pallet 61 in the information image to extract an object matched with the template in the information image. The computing unit 104 detects the extracted object as the front surface 61a of the pallet 61 to be loaded and unloaded. In addition, the computing unit 104 reads the actual dimension information of the pallet 61A from the storage unit 108 when detecting the pallet 61A in FIG. 11(b) and reads the actual dimension information of the pallet 61B from the storage unit 108 when detecting the pallet 61B.

Figure 12:
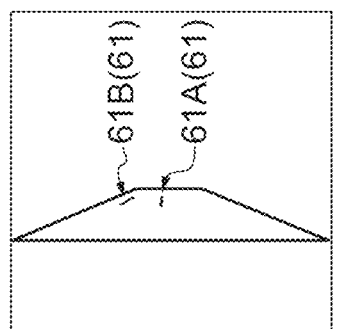
FIG. 12 (a) to FIG. 12 (d) illustrate diagrams showing a surrounding image of the feature plane and a detected front surface of the pallet which is captured while the imaging unit is being moved.
Figure 12:
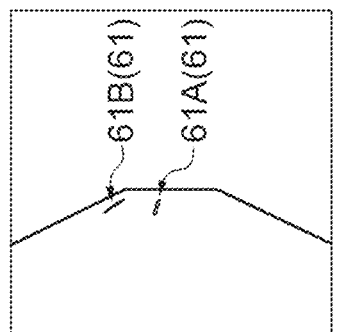
Figure 12:
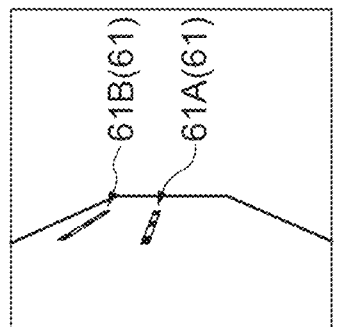
Figure 12:
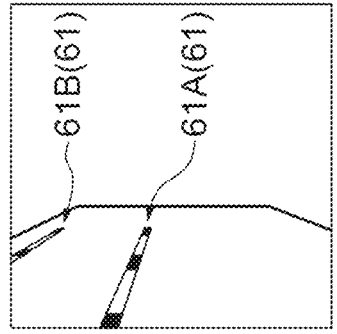

As described above, when the computing unit 104 detects the front surface 61a of the pallet 61 to be loaded and unloaded in the information image, the front surface 61a of the pallet 61 and the feature plane when the information image is generated are substantially matched with each other. Since the three-dimensional position and posture of the feature plane SF are known, it is possible to compute the three-dimensional position and posture of the pallet 61 on the basis of the detected position of the pallet 61 in the information image and to specify the front surface 61a of the pallet 61 to be loaded and unloaded. FIG. 12 is a diagram in which the detection results of the position and posture of the front surfaces 61Aa and 61Ba of the pallets 61A and 61B and the feature plane SF are extracted and illustrated. FIG. 12(a) illustrates the results at the position where the imaging unit 32 is 4 m away from the pallet 61A to be loaded and unloaded. FIG. 12(b) illustrates the results at the position where the imaging unit 32 is 3 m away from the pallet 61A. FIG. 12(c) illustrates the results at the position where the imaging unit 32 is 2 m away from the pallet 61A. FIG. 12(d) illustrates the results at the position where the imaging unit 32 is 1 m away from the pallet 61A. The computing unit 104 can compute the position and posture of the front surface 61Aa of the pallet 61A at each imaging position on the basis of the information obtained from the surrounding image.

Figure 13:
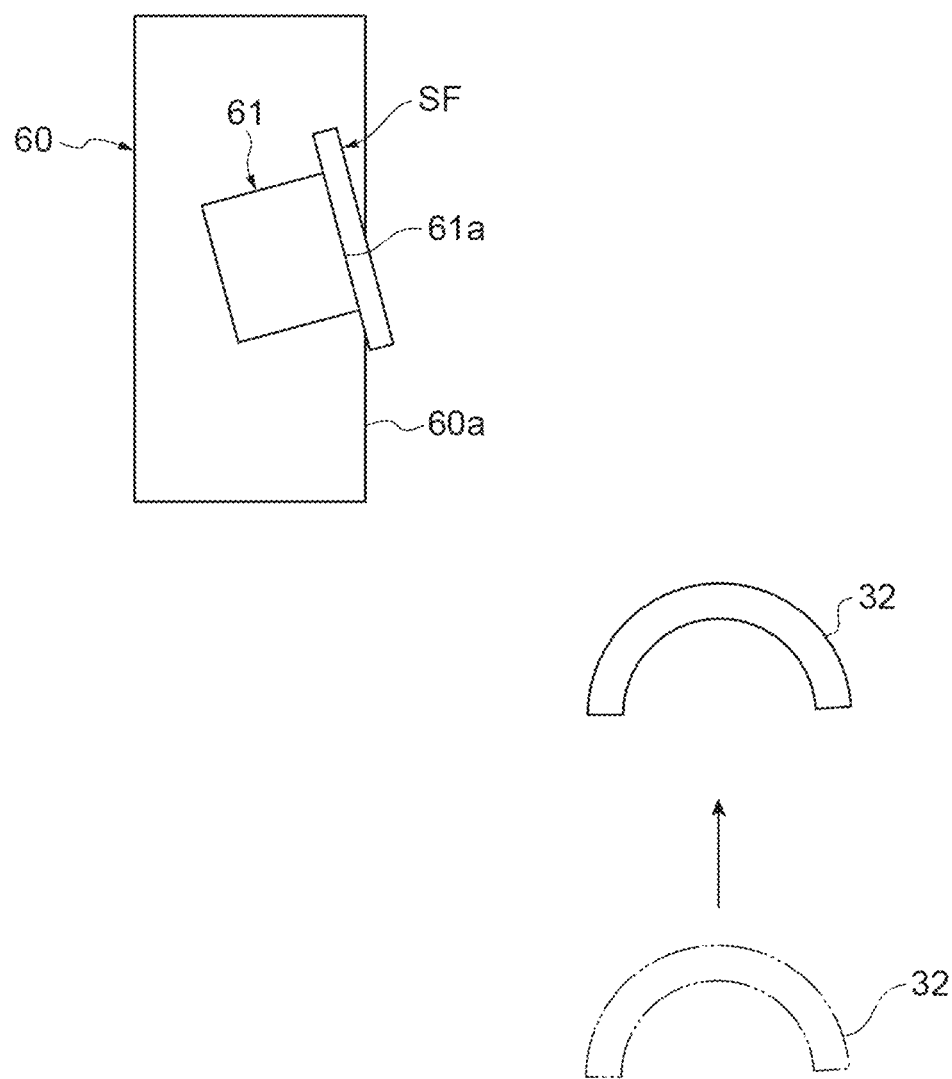
FIG. 13 is a schematic plan view illustrating a time-series positional relationship among the imaging unit, the shelf, and the pallet.

The adjustment unit 106 adjusts the conditions for creating the information image to improve the computation accuracy of the computing unit 104. In this embodiment, the adjustment unit 106 adjusts the position and inclination of the feature plane SF used when the information image is created as the conditions for creating the information image. Specifically, the computation accuracy of the computing unit 104 is improved by adjusting the equation of the three-dimensional plane related to the feature plane SF when the information image is created. Since the information image creation unit 103 has not detected the pallet 61 to be loaded and unloaded, the feature plane SF is set for the front surface 60a of the shelf 60 assuming that the front surface 61a of the pallet 61 to be loaded and unloaded is present on the same plane as the front surface 60a of the shelf 60 or in the vicinity of the plane. In this case, as illustrated in FIG. 9, the pallet 61 to be loaded and unloaded may be separated from the feature plane SF or may be inclined with respect to the feature plane SF. At that time, the shape and size of the front surface 61a of the pallet 61 in the information image slightly deviates from the actual shape and size of the front surface 61a. Therefore, after the pallet 61 to be loaded and unloaded is detected, the adjustment unit 106 calculates the feature plane SF matched with the front surface 61a of the pallet 61 as illustrated in FIG. 13. Specifically, the adjustment unit 106 changes parameters, which constitute the equation of the plane when the information image is created, to recalculate the position and orientation of the front surface 61a of the pallet 61 in the information image and calculates parameters for giving an information image having the maximum degree of matching with the edge template. The calculated feature plane SF is matched with the front surface 61a of the pallet 61 more accurately than the front surface 60a of the shelf 60. Therefore, the computing unit 104 can compute the position and posture of the front surface 61a of the pallet 61 with high computation accuracy. Further, the adjustment unit 106 sets a feature plane SF, which is in a narrower range than the feature plane SF set for the front surface 60a of the shelf 60, for the front surface 61a of the pallet 61. Therefore, the information image created using the adjusted feature plane SF is an enlarged image of the front surface 61a of the pallet 61. As a result, the computing unit 104 can compute the position and posture of the front surface 61a of the pallet 61 with high computation accuracy. Further, in addition to adjusting both the position and the inclination, only the position may be adjusted, or only the inclination may be adjusted.

The operation control unit 107 controls the position or posture of the vehicle body 51 on the basis of the information related to the position and posture of the front surface 61a of the pallet 61 computed by the computing unit 104. Since the operation control unit 107 understands the position and posture of the front surface 61a of the pallet 61 to be loaded and unloaded at the time when the forklift 50 travels on the track TL1, it controls the turning position or the turning track (track TL2) of the forklift 50 such that the forklift 50 can smoothly insert the fork 25 into the hole portion of the front surface 61a of the pallet 61. In addition, the operation control unit 107 may be configured as a control unit that is separated from the control unit 110 of the item detection device 100. In this case, the control unit 110 of the item detection device 100 outputs the computation result to the control unit of the operation control unit 107, and the operation control unit 107 performs operation control on the basis of the computation result of the item detection device 100.

Figure 14:
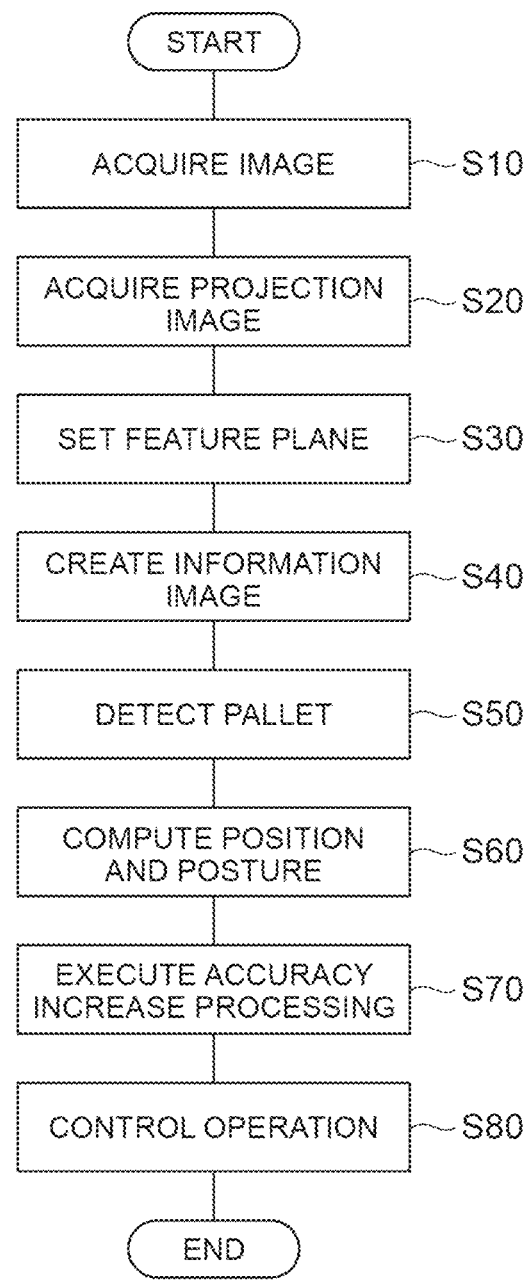
FIG. 14 is a flowchart illustrating the processing content of an item detection method.

Next, the content of an item detection method according to this embodiment will be described with reference to FIG. 14. FIG. 14 is a flowchart illustrating the processing content of the item detection method. The processing content illustrated in FIG. 14 is executed by the control unit 110 of the item detection device 100. However, the processing content illustrated in FIG. 14 is only an example, and the invention is not limited thereto.

As illustrated in FIG. 14, the image acquisition unit 101 of the control unit 110 executes an image acquisition step of acquiring a surrounding image obtained by capturing the surroundings of the vehicle body 51 (Step S10). In the image acquisition Step S10, the image acquisition unit 101 acquires the image captured by the imaging unit 32 as the surrounding image. Then, the feature plane setting unit 102 executes a projection image acquisition step of acquiring a projection image projected onto the moving plane DF that moves in synchronization with the movement of the place where the surrounding image is captured (Step S20). Then, the feature plane setting unit 102 executes a feature plane setting step of setting the feature plane SF in which the features of the front surface 61a of the pallet 61 to be loaded and unloaded are shown (Step S30). The feature plane setting unit 102 generates the three-dimensional restored shape of the pallet 61 and the shelf 60 on the basis of the projection image on the moving plane DF created from the surrounding image and sets the feature plane SF for the front surface 60a of the shelf 60 on the basis of the restored shape (see FIG. 9).

The information image creation unit 103 executes an information image creation step of creating an information image in which information related to the front surface 61a of the pallet 61 has been converted into an easily recognizable state on the basis of the surrounding image (Step S40). In the information image creation Step S40, the information image creation unit 103 creates the information image using the feature plane SF. The information image creation unit 103 associates dimensions corresponding to one pixel with the information image.

The computing unit 104 executes a pallet detection step of detecting the pallet 61 to be loaded and unloaded on the basis of the information image (Step S50). The computing unit 104 executes a computing step of computing the position and posture of the front surface 61a of the pallet 61 on the basis of the information image (Step S60). In the computing Step S60, the computing unit 104 performs computation on the basis of the relationship between the pixels of the information image and the dimensions of the front surface 61a of the pallet 61. The computing unit 104 performs the template matching between information related to an edge portion of the front surface 61a of the pallet 61 detected from the information image and the actual dimension information of the front surface 61a stored in advance in the storage unit 108 (see FIG. 11). Therefore, the computing unit 104 detects the pallet 61 to be loaded and unloaded and computes the position and posture of the front surface 61a.

The control unit 110 executes an accuracy increase processing step of increasing the computation accuracy of the computing unit 104 (Step S70). In the accuracy increase processing Step S70, the adjustment unit 106 adjusts the parameters of the equation of the three-dimensional plane related to the feature plane SF when the information image is created. The adjustment unit 106 calculates a parameter for maximizes the degree of matching with the edge template, detects the equation of the three-dimensional plane for calculating the information image having the highest degree of matching, and sets the feature plane SF (see FIG. 13). Then, the information image creation unit 103 creates an information image using the adjusted feature plane SF. The computing unit 104 computes the position and posture of the front surface 61a of the pallet 61 on the basis of the information image created using the adjusted feature plane SF.

The operation control unit 107 executes an operation control step of controlling the position or posture of the vehicle body 51 on the basis of the information related to the position and posture of the front surface 61a of the pallet 61 computed by the computing unit 104 (Step S80). In the operation control Step S80, the operation control unit 107 controls the turning position or turning track (track TL2) of the forklift 50 such that the forklift 50 can smoothly insert the fork 25 into the hole portion of the front surface 61a of the pallet 61. In this way, the process illustrated in FIG. 14 is completed.

Next, the operation and effect of the item detection device 100, the item detection method, and the forklift 50 according to this embodiment will be described.

First, for comparison with the present application, the existing techniques in the field of pallet position and posture detection will be described. The pallet position and posture detection methods according to the existing techniques can be roughly divided into a method of giving a special mark for position and posture detection to a pallet and a method that does not require the special mark. However, the method for giving the mark has a problem that it requires a lot of time and effort and is not used due to dirt or the like. On the other hand, as the existing technique of the method that does not use the mark, there is a method which detects a fork hole from a two-dimensional grayscale image acquired from almost the front of a pallet and calculates the position and posture with high accuracy. Alternatively, there is a method in which a three-dimensional information input device, such as a laser, is provided and the position and posture of a pallet are calculated by matching between a feature point of a three-dimensional point cloud and a pallet feature point set model. However, both methods assume that measurement is performed at a short distance from almost the front of a target pallet and have a problem that they are not effectively used to detect the pallet from other positions and to detect the position and posture of the pallet.

The above-mentioned existing techniques are effective for purposes such as a semi-automatic operation which more accurately detects the position and posture of a vehicle after the vehicle approaches the pallet to some extent, but are not effectively used in a case in which the surroundings are observed at a distance in directions other than the front direction, a target pallet is detected, and the position and posture of the pallet are calculated. On the other hand, the work of finding a pallet at a distance of several meters while traveling in front of the shelf and loading the pallet is usually performed at a distribution site. Therefore, as a result of thorough research, the inventors have found that the automation of industrial vehicles requires the development of a technique capable of effectively performing the work.

Here, in recent years, an inexpensive and available fisheye camera has been provided in an industrial vehicle, which makes it possible to acquire wide-range two-dimensional surrounding images in time series while moving. The surrounding image includes information of an object in an arbitrary direction and at an arbitrary distance. However, it is difficult to search for and detect a target pallet due to distortion in the wide-angle image. Therefore, the inventors have found that a wide-angle surrounding image is projected onto an appropriate three-dimensional plane (using the fact that surrounding three-dimensional information can be acquired on the basis of the principle of moving stereo) to be converted into a projection image (information image) in which a target pallet is most easily searched, which makes it possible to accurately detect the pallet and to calculate the position and posture of the pallet at the same time.

Therefore, the item detection device 100 that detects an item to be loaded and unloaded includes: the image acquisition unit 101 that acquires a surrounding image obtained by capturing the surroundings of the item detection device 100; the information image creation unit 103 that creates an information image in which information related to a part to be loaded and unloaded in the item has been converted into an easily recognizable state, on the basis of the surrounding image; and the computing unit 104 that computes the position and posture of the front surface 61a on the basis of the information image.

The item detection device 100 includes the image acquisition unit 101 that acquires the surrounding image obtained by capturing the surroundings of the item detection device 100 and the information image creation unit 103 that creates the information image in which the information related to the front surface 61a of the pallet 61 has been converted into an easily recognizable state. For example, in some cases, it is difficult to directly detect an item from an image showing the aspect of the surroundings of the item detection device 100, depending on the distance and positional relationship between the item detection device 100 and the pallet 61. Specifically, as illustrated in FIG. 5, in the surrounding image of the fisheye camera, the shelf 60 and the pallet 61 are shown in a curved state. It is difficult to directly specify the pallet 61 from the surrounding image. In contrast, the information image creation unit 103 can create an information image suitable for detecting the front surface 61a of the pallet 61 on the basis of the surrounding image obtained by capturing the surroundings of the item detection device 100. Specifically, as illustrated in FIG. 10, in the information image, the front surface 61a of the pallet 61 is shown in a shape as if it is captured from the front, and the size of the front surface 61a is constant regardless of the imaging position. Further, the item detection device 100 includes the computing unit 104 that computes the position and posture of the front surface 61a of the pallet 61 on the basis of the information image. In this way, the computing unit 104 performs computation through the information image suitable for detecting the front surface 61a of the pallet 61 to compute the position and posture of the front surface 61a in a stage before the item detection device 100 approaches the vicinity of the pallet 61. Therefore, it is possible to detect the item to be loaded and unloaded, regardless of the positional relationship with the item.

The item detection device 100 further includes the adjustment unit 106 that adjusts the conditions for creating the information image. Therefore, the adjustment unit 106 can adjust the information image such that the item detection device 100 can easily detect the front surface 61a of the pallet 61 with high accuracy. As a result, the computing unit 104 can compute the position and posture of the front surface 61a of the pallet 61 with higher accuracy.

In the item detection device 100, the information image is an image obtained by projecting the information acquired at the position where the surrounding image is acquired onto the plane that is arbitrarily set. Therefore, even when the surrounding image is captured from the position where it is difficult to directly detect the part to be loaded and unloaded, the information acquired at the position where the surrounding image is acquired is projected onto an arbitrary plane to create an appropriate information image that makes it easy to detect the front surface 61a of the pallet 61. As a result, it is easy to detect the front surface 61a of the pallet 61, and the computing unit 104 can accurately compute the state of the item.

In the item detection device 100, the information image creation unit 103 associates dimensions corresponding to one pixel with the information image, and the computing unit 104 performs computation on the basis of the relationship between the pixels of the information image and the dimensions of the front surface 61a of the pallet 61. Therefore, since the size of the front surface 61a of the pallet 61 shown in the information image has a constant correspondence relationship with the actual dimensions, the computing unit 104 can accurately compute the state of the pallet 61.

In the item detection device 100, the computing unit 104 performs the template matching between the information related to an edge portion of the front surface 61a of the pallet 61 detected from the information image and the actual dimension information of the front surface 61a of the pallet 61 stored in advance. Therefore, the computing unit 104 can perform the template matching using the actual dimension information of the front surface 61a of the pallet 61 to accurately compute the state of the pallet 61.

The item detection device 100 includes the feature plane setting unit 102 that sets the feature plane SF onto which the features of the front surface 61a of the pallet 61 are projected. The feature plane setting unit 102 generates a three-dimensional restored shape related to the pallet 61 and the surroundings (here, the shelf 60) of the pallet 61 on the basis of a plurality of surrounding images captured at different positions and sets the feature plane SF on the basis of the restored shape. The information image creation unit 103 creates the information image using the feature plane SF. Therefore, the information image creation unit 103 can create the information image that accurately shows the features of the front surface 61a of the pallet 61 even when the state in which the pallet 61 is placed is unknown. Then, the feature plane SF is set on the basis of the three-dimensional restored shape related to the pallet 61 or the surroundings of the pallet 61. From the above, the computing unit 104 can accurately compute the state of the pallet 61 using the feature plane SF.

In the item detection device 100, the feature plane setting unit 102 sets the feature plane SF using the moving plane DF that moves in synchronization with the movement of the place where the surrounding image is captured. In this case, the feature plane setting unit 102 can acquire a plurality of images projected onto the moving plane DF at different positions. Therefore, the feature plane setting unit 102 can generate a three-dimensional restored shape in a short time using the existing method.

In the item detection device 100, the surrounding image is an image acquired by a fisheye camera or a wide-angle camera. This makes it possible to acquire the surroundings of the item detection device 100 as a wide-range surrounding image with a monocular camera.

The item detection method according to the embodiment of the invention detects an item to be loaded and unloaded and includes the image acquisition Step S10 of acquiring a surrounding image obtained by capturing the surroundings, the information image creation Step S40 of creating the information image in which information related to the front surface 61a of the pallet 61 has been converted into an easily recognizable state on the basis of the surrounding image, and the position and posture computing Step S60 of computing at least one of the position and posture of the front surface 61a of the pallet 61 on the basis of the information image.

According to the item detection method, it is possible to obtain the same operation and effect as those of the item detection device 100.

The forklift 50 according to the embodiment of the invention includes the vehicle body 51, the imaging unit 32 that captures an image of the surroundings of the vehicle body 51, and the control unit 110 that performs control to detect the pallet 61 to be loaded and unloaded on the basis of the image acquired by the imaging unit 32. The control unit 110 includes the image acquisition unit 101 that acquires the surrounding image obtained by capturing the surroundings of the vehicle body 51 from the imaging unit 32, the information image creation unit 103 that creates the information image in which the information related to the front surface 61a of the pallet 61 has been converted into an easily recognizable state, on the basis of the surrounding image, and the computing unit 104 that computes at least one of the position and posture of the front surface 61a of the pallet 61 on the basis of the information image.

According to the forklift 50, it is possible to obtain the same operation and effect as those of the item detection device 100.

In the forklift 50, the control unit 110 controls the position and posture of the vehicle body 51 on the basis of information related to at least one of the position and posture of the pallet 61. Therefore, the forklift 50 can smoothly load and unload items.

The invention is not limited to the above-described embodiment.

For example, in the above-described embodiment, the computing unit 104 performs the template matching to detect the pallet 61. However, in addition to this, the computing unit 104 may perform other detection methods. The computing unit 104 may comprehensively determine the result of the template matching and the results of other detection methods to detect the pallet 61.

Figure 15:
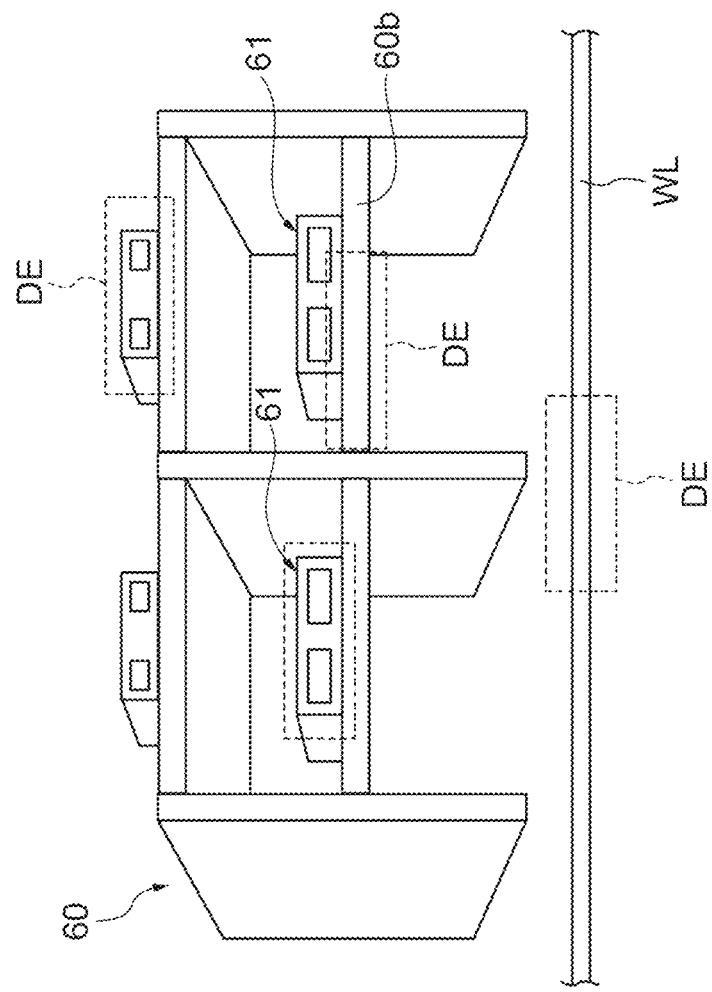
FIG. 15 is a diagram illustrating an aspect in which a pallet candidate portion is set in an information image.

Specifically, as illustrated in FIG. 15, there are a plurality of pallet candidate portions DE in the information image. The pallet candidate portion DE indicates a region in which the pallet 61 is likely to be present. The pallet candidate portion DE is set for, for example, a region in which the degree of matching is equal to or greater than a predetermined threshold value as a result of template matching. As a result, the pallet candidate portion DE is set at the position of the pallet 61. However, the pallet candidate portion DE is also set in a portion similar to the pallet 61. In the information image illustrated in FIG. 15, for example, a white line WL, a portion around the white line WL, a shelf board 60b of the shelf 60, and a portion around the shelf board 60b are detected as the portions similar to the pallet 61.

Figure 16:
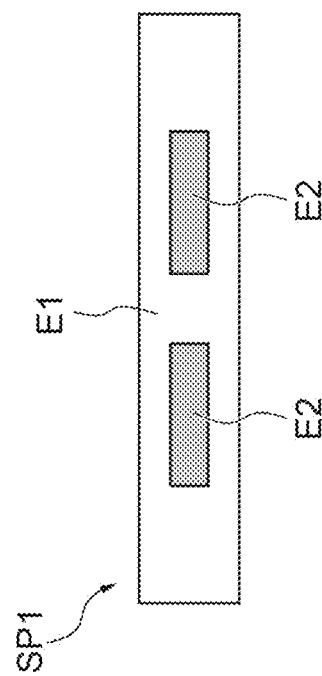
FIG. 16(a) is a diagram illustrating a shape pattern of the pallet.
FIG. 16(b) is a diagram illustrating a similar shape pattern of an object similar to the pallet.
Figure 16:
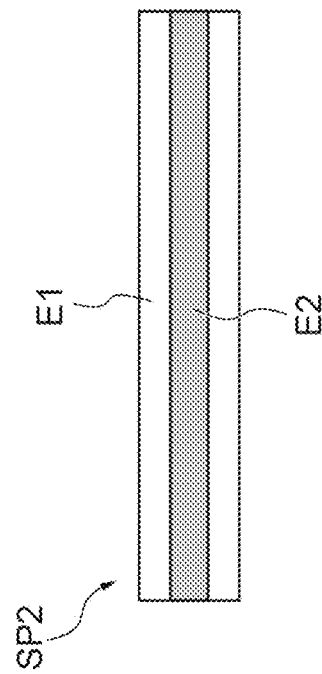

Here, the computing unit 104 has a shape pattern SP1 illustrated in FIG. 16(a). The shape pattern SP1 has a first region E1 and a second region E2 that imitate the shape of the pallet 61. The first region E1 corresponds to a portion other than the hole portion of the front surface 61a of the pallet 61. The first region E1 appears bright in the image because it is a portion that is likely to be hit by light. The second region E2 corresponds to the hole portion in the front surface 61a of the pallet 61. The second region E2 appears dark in the image because it is a portion that is less likely to be hit by light.

Figure 17:
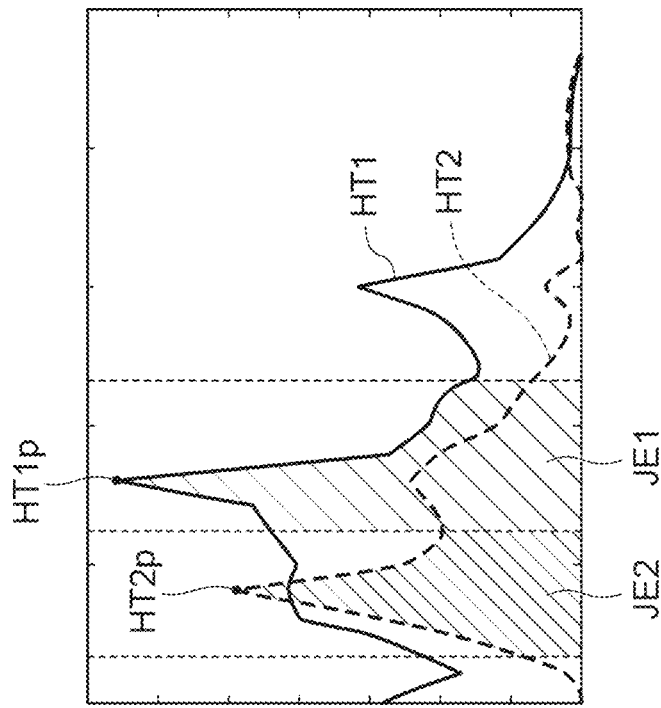
FIG. 17(a) illustrates a pixel value histogram acquired by a pallet candidate portion set at the position of the pallet.
FIG. 17(b) illustrates a pixel value histogram acquired by a pallet candidate portion set in a portion similar to the pallet.
Figure 17:
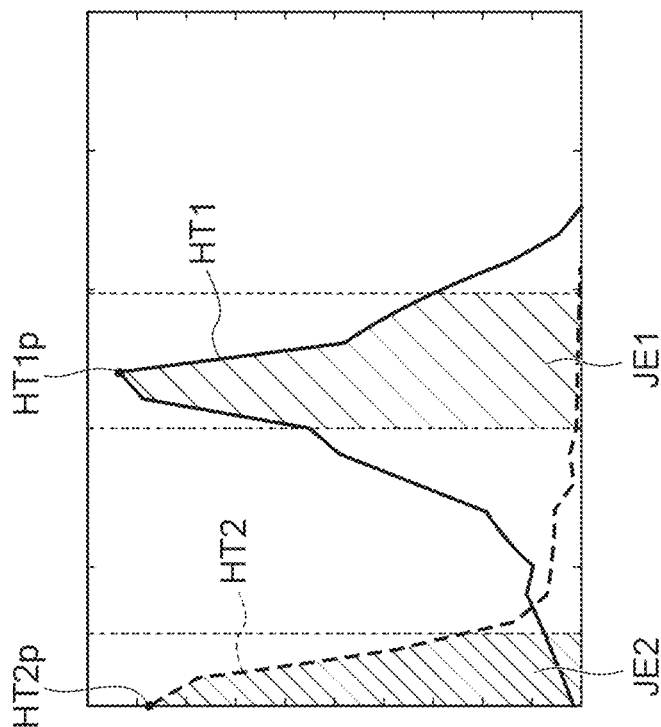

The computing unit 104 applies the shape pattern SP1 to each pallet candidate portion DE. The computing unit 104 computes a pixel value histogram (intensity histogram) in the first region E1. The computing unit 104 computes a pixel value histogram in the second region E2. The pixel value histogram is a graph showing the frequency of pixel values in the image (the number of pixels having each pixel value). FIG. 17(a) illustrates a pixel value histogram acquired by the pallet candidate portion DE which is set at the position of the pallet 61. FIG. 17(b) illustrates a pixel value histogram acquired by the pallet candidate portion DE that is set for an object similar to the pallet 61. In the drawings, a pixel value histogram HT1 is the pixel value histogram of the first region E1, and a pixel value histogram HT2 is the pixel value histogram of the second region E2. The horizontal axis of the coordinates illustrated in FIG. 17 indicates intensity (pixel value), and the vertical axis indicates the number of pixels.

Here, when an image that is present in the pallet candidate portion DE is the image of the pallet 61, the intensity in each of the first region E1 and the second region E2 is a value in a certain range and is substantially uniform. Therefore, the computing unit 104 calculates the degree of uniformity indicating the degree to which the first region E1 and the second region E2 are uniform regions from the pixel value histograms in the first region E1 and the second region E2. The uniform region is a region in which the intensity is a value in a predetermined range and is uniform. As the first region E1 and the second region E2 become closer to the uniform region, the degree of uniformity becomes higher.

The computing unit 104 extracts a first peak neighborhood region JE1 and a second peak neighborhood region JE2 from the pixel value histograms. The peak neighborhood regions JE1 and JE2 are obtained by extracting partial intensity ranges of the pixel value histograms HT1 and HT2 of the regions E1 and E2, respectively. In FIG. 17, the peak neighborhood regions JE1 and JE2 are hatched regions. The peak neighborhood regions JE1 and JE2 include peaks (HT1p and HT2p) of the pixel value histograms HT1 and HT2 and regions before and after the peaks, respectively. In addition, the intensities of an upper-limit-side boundary and a lower-limit-side boundary of the peak neighborhood regions JE1 and JE2 are determined by, for example, fixed widths from the peaks HT1p and HT2p.

As illustrated in FIG. 17(a), in the pallet 61, the intensity of an image in the first region E1 is high and uniform. Therefore, the pixel value histogram HT1 has a high peak HT1p in a portion having a large intensity value, and many pixels are concentrated around the peak HT1p. In addition, the intensity of an image in the second region E2 is low and uniform, the pixel value histogram HT2 has a high peak HT2p in a portion having a small intensity value, and many pixels are concentrated around the peak HT2p. Therefore, the ratio of the number of pixels in the peak neighborhood region JE1 to the total number of pixels in the first region E1 (the area of the entire pixel value histogram HT1) is high. In addition, the ratio of the number of pixels in the peak neighborhood region JE2 to the total number of pixels in the second region E2 (the area of the entire pixel value histogram HT2) is high. In addition, the intensities of the first region E1 and the second region E2 vary depending on, for example, the amount of light hitting the pallet 61. That is, the positions of the peaks HT1p and HT2p of the pixel value histograms HT1 and HT2 differ depending on ambient light or the position where the pallet is placed. However, even when the positions of the peaks HT1p and HT2p vary, the feature that the pixels are concentrated around the peaks HT1p and HT2p is common to all of the pallets 61.

On the other hand, in a portion similar to the pallet 61, a low-intensity portion is included in the first region E1, or a high-intensity portion is included in the second region E2. Therefore, as illustrated in FIG. 17(b), the pixel value histograms HT1 and HT2 have a plurality of peaks, or the number of pixels in portions other than the neighborhood regions JE1 and JE2 is large. In this case, the ratio of the number of pixels in the peak neighborhood regions JE1 and JE2 to the total number of pixels in each of the regions E1 and E2 is low.

In addition, when the pixel value histograms HT1 and HT2 have a plurality of peaks as illustrated in FIG. 17(b), it is assumed that the highest peaks are "peaks HT1p and HT2p".

Here, the computing unit 104 may calculate the degree of uniformity on the basis of the sum of the number of pixels having the pixel values of the peak neighborhood regions JE1 and JE2 in the pixel value histograms with respect to the total number of pixels in the first region E1 and the second region E2. The total number of pixels is the sum of the total number of pixels in the pixel value histogram HT1 and the total number of pixels in the pixel value histogram HT2.

Therefore, the computing unit 104 can calculate the degree of uniformity using simple computation. When the degree of uniformity is equal to or greater than a predetermined threshold value, the computing unit 104 detects that the pallet 61 is present in the pallet candidate portion DE. When the degree of uniformity is less than the predetermined threshold value, the computing unit 104 determines that the object which is present in the pallet candidate portion DE is not the pallet 61.

As described above, in the item detection device 100, the item is the pallet 61. The pallet candidate portion DE indicating the region in which the pallet 61 is likely to be present is given to the information image. The computing unit 104 has the shape pattern SP1 including the first region E1 and the second region E2 that imitate the shape of the pallet 61. The computing unit 104 applies the shape pattern SP1 to each pallet candidate portion DE to calculate the degree of uniformity indicating the degree to which the first region E1 and the second region E2 are uniform regions from the pixel value histograms in the first region E1 and the second region E2. The hole portion into which the fork is inserted is formed in the front surface 61a which is the part to be loaded and unloaded in the pallet 61. Therefore, a region corresponding to the hole portion is a uniform region in which the pixel value histogram is uniform, and a region corresponding to a portion other than the hole portion is a uniform region in which the pixel value histogram is uniform. Therefore, the computing unit 104 calculates the degree of uniformity indicating the degree to which the first region E1 and the second region E2 are uniform regions.

When the degree of uniformity is high, the computing unit 104 can determine that the possibility of the pallet being present in the pallet candidate portion DE is high. Further, the pixel values of the regions E1 and E2 of the pallet 61 are not calculated, but the degree of uniformity of the region which does not depend on the peak position of the histogram is calculated. Therefore, the computing unit 104 can accurately detect the pallet 61 regardless of brightness at the time of imaging.

As illustrated in FIG. 16(b), in the item detection device 100, the computing unit 104 further has a similar shape pattern SP2 that is similar to the pallet 61. The similar shape pattern SP2 is a shape pattern that imitates the white line WL (see FIG. 15) on a road surface. The computing unit 104 calculates the degree of uniformity for a certain pallet candidate portion DE using the shape pattern SP1 and calculates the degree of uniformity for the pallet candidate portion DE using the similar shape pattern SP2. The computing unit 104 uses, as a pallet detection condition, the condition that the degree of uniformity when the shape pattern SP1 is used is higher than the degree of uniformity when the similar shape pattern SP2 is used.

As described above, the computing unit 104 identifies the pallet 61 from the pallet candidate portion DE using the shape pattern SP1 and the similar shape pattern SP2. That is, when an object (for example, the white line WL on the road surface) that is similar to the pallet 61 and is likely to be confused with the pallet 61 is assumed, the computing unit 104 prepares the similar shape pattern SP2 for the confusing object in advance. Then, the computing unit 104 can calculate the degree of uniformity based on the similar shape pattern SP2 for the confusing object and perform magnitude comparison with the degree of uniformity based on the shape pattern SP1 to determine the pattern. Therefore, the computing unit 104 can prevent a confusing object from being erroneously detected as the pallet 61.

Figure 18:
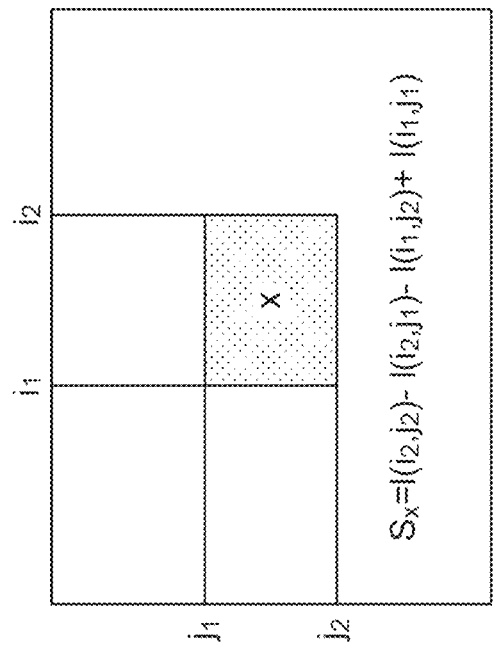
FIG. 18 (a) and FIG. 18 (b) are diagrams illustrating an example of an integral image.
Figure 18:
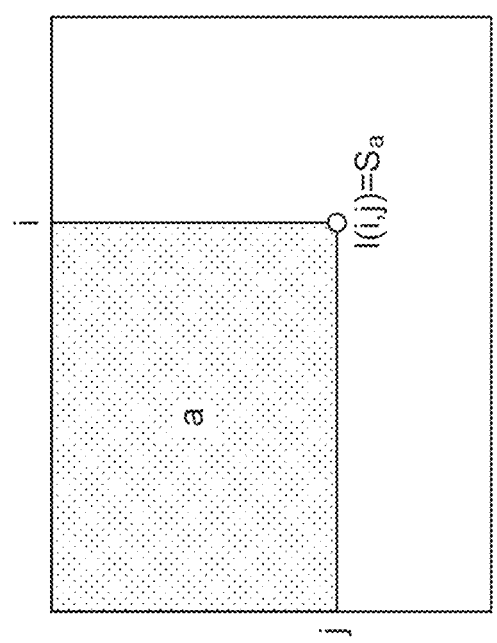

In the item detection device 100, the computing unit 104 may set the pallet candidate portion DE, the first region E1, and the second region E2 in a rectangular shape and use an integral image to calculate the pixel value histogram. The outward shape of the front surface 61a of the pallet 61 is rectangular, and the shape of the hole portion is also rectangular. As illustrated in FIG. 18, the integral image is the existing technique for calculating the total sum in an arbitrary rectangle at high speed. Specifically, the computing unit 104 sets, for each coordinate value, a rectangular region that has the origin of the image as an upper left corner and the coordinate value as a lower right corner. For example, as illustrated in FIG. 18(a), a rectangular region indicated by "a" is set for coordinates "(i, j)". Then, the computing unit 104 calculates in advance an integral image I in which the total sum of the pixel values in the region (represented by $S_a$) is recorded. The total sum of the pixel values in an arbitrary rectangular region can be calculated at high speed by adding or subtracting the values of the integral images I of the coordinate values of four corners of the region. For example, as illustrated in FIG. 18(b), when computing the total sum of the pixel values SX in a rectangular region represented by "x", the computing unit 104 calculates the sum by subtracting the values of the integral images I of "$(i_2, j_1)$" and "$(i_1, j_2)$" from the value of the integral image I of "$(i_2, j_2)$" and adding the value of the integral image I of "$(i_1, j_1)$" that has been subtracted twice. When calculating the pixel value histograms in each of the regions E1 and E2 of the pallet candidate portion DE, the computing unit 104 uses the integral image L that has been calculated in advance for each bin n of the histograms. In addition, the bin is a unit obtained by dividing the pixel values by a predetermined width and summing the number of pixels in the range of the pixel values. For example, assuming that the width of the pixel values for setting the bin is 10, the bin is the sum of the number of pixels having pixel values 0 to 9, 10 to 19, . . . . The computation using the integral image L may be performed by a known computing method. Therefore, the computing unit 104 can perform the computation at high speed using the rectangular shape of the pallet 61 and the integral image $I_n$.

Further, the computing unit 104 may perform computation at high speed using the integral image when calculating the degree of matching (for example, zero-mean normalized cross-correlation (ZNCC)) at each position in the image in the detection of the pallet.

In addition, in the above-described embodiment, the adjustment unit 106 adjusts the parameters such that the degree of matching between the pallet 61 in the information image and the edge template is maximized after the feature plane SF is set once. Here, the adjustment unit 106 may perform the following process such that the parameters for maximizing the degree of matching can be searched at high speed. That is, the adjustment unit 106 computes the geometric relationship between the position where the surrounding image is acquired and the feature plane SF onto which the information acquired at the position is projected. The adjustment unit 106 estimates, from the geometric relationship, the inclination of a ridge line of a ridge-type peak in a variation in the degree of matching with respect to a variation in the position and posture of the feature plane SF. The adjustment unit 106 searches for the local maximum value of the degree of matching based on the direction of the inclination.

Figure 19:
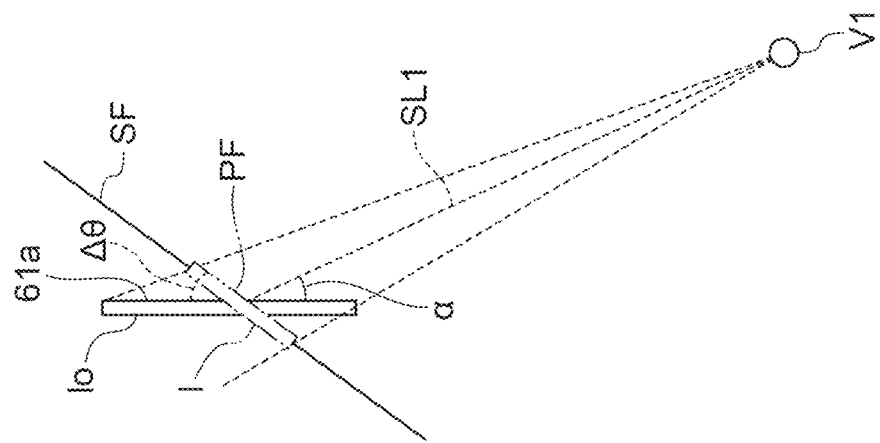
FIGS. 19(a) and 19(b) are conceptual diagrams illustrating a geometric relationship between a position where the surrounding image is acquired and a projection surface onto which information acquired at the position is projected.
Figure 19:
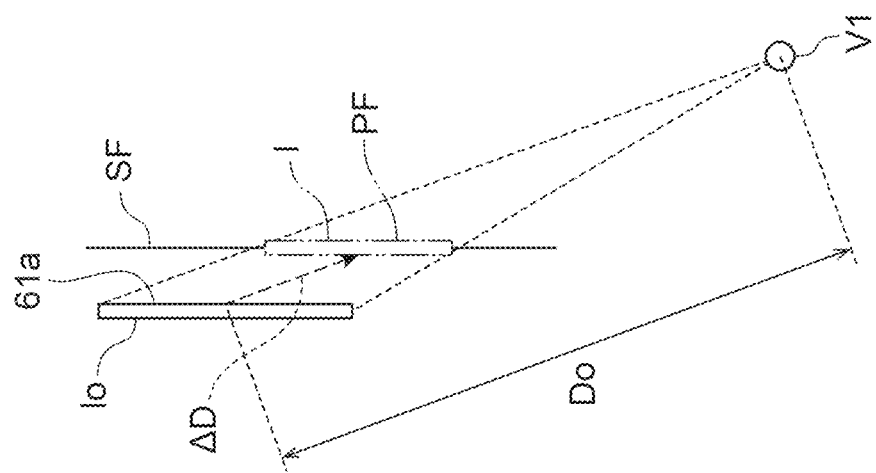

The geometric relationship between the position where the surrounding image is acquired and the feature plane SF onto which the information acquired at the position is projected will be described with reference to FIG. 19. Here, it is assumed that the position where the surrounding image is acquired is the viewpoint V1. A projection image PF is an image projected onto the feature plane SF of the front surface 61a of the pallet 61.

As illustrated in FIG. 19(a), the length of the front surface 61a of the actual pallet 61 is represented by "$l_0$", and the length of the projection image PF is represented by "l". A distance between the viewpoint V1 and a reference position of the front surface 61a is represented by "D", and a correct answer value of the distance is represented by "Do". The magnitude of the deviation of the projection image PF from the actual front surface 61a in a depth direction is represented by "$\Delta D$". In this case, "$\Delta l_D$" indicating the deviation of l from $l_0$ which occurs due to the deviation of $\Delta D$ is represented by the following Expression (1).

$$\Delta l_D = (l_0/D_0) \times \Delta D \qquad (1)$$

As illustrated in FIG. 19(b), when a reference line SL1 between the viewpoint V1 and a center point of the front surface 61a is set, an angle between the front surface 61a and the reference line SL1 is represented by "α". The rotation angle of the feature plane SF which is a projection plane on the vertical axis is represented by "θ", and the magnitude of the deviation of the angle from the actual front surface 61*a* is represented by "Δθ". In this case, "$\Delta l_\theta$" indicating the deviation of l from $l_0$ which occurs due to the deviation of Δθ is represented by the following Expression (2).

$$\Delta l_0 \approx (l_0/\tan \alpha) \times \Delta\theta \quad (2)$$

When "$\Delta l_D$" and "$\Delta l_0$" have the relationship represented by Expression (3), Expressions (1) and (2) are substituted into Expression (3) to obtain Expression (4).

$$\Delta l_D + \Delta l_0 = 0 \quad (3)$$

$$\Delta\theta \approx -(\tan \alpha/D_0) \times \Delta D \quad (4)$$

Figure 20:
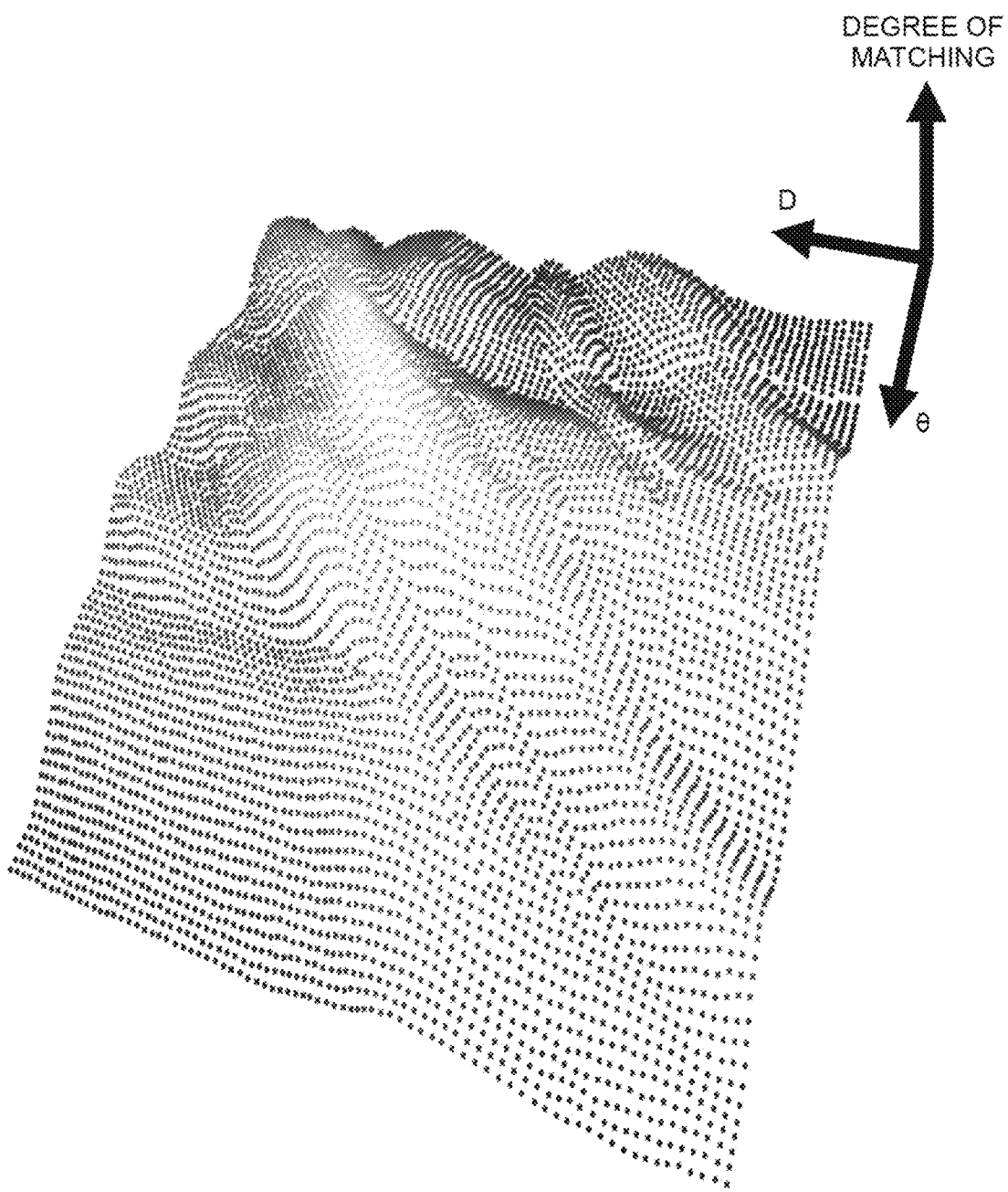
FIG. 20 is a diagram illustrating an example of a distribution of a degree of matching when an angle (θ) of the projection surface and a distance (D) from the viewpoint are changed.

Here, FIG. 20 illustrates an example of the distribution of the degree of matching when θ and D are changed. A parameter of one horizontal axis in a three-dimensional graph is "θ", a parameter of the other horizontal axis is "D", and a parameter of the vertical axis is the degree of matching. As described above, when the parameters related to the position and posture of the feature plane SF are changed, the degree of matching changes, and a distribution in which a mountain is drawn as illustrated in FIG. 20 is obtained. In the distribution, there is a local maximum value at which the degree of matching is highest. The adjustment unit 106 searches for the local maximum value and acquires a parameter corresponding to the local maximum value to understand the condition that the degree of matching can be maximized. However, when the adjustment unit 106 computes the degree of matching for all of the (θ, D) coordinate values, the amount of computation increases enormously. Therefore, the adjustment unit 106 searches for the local maximum value at high speed with a small amount of computation.

Figure 21:
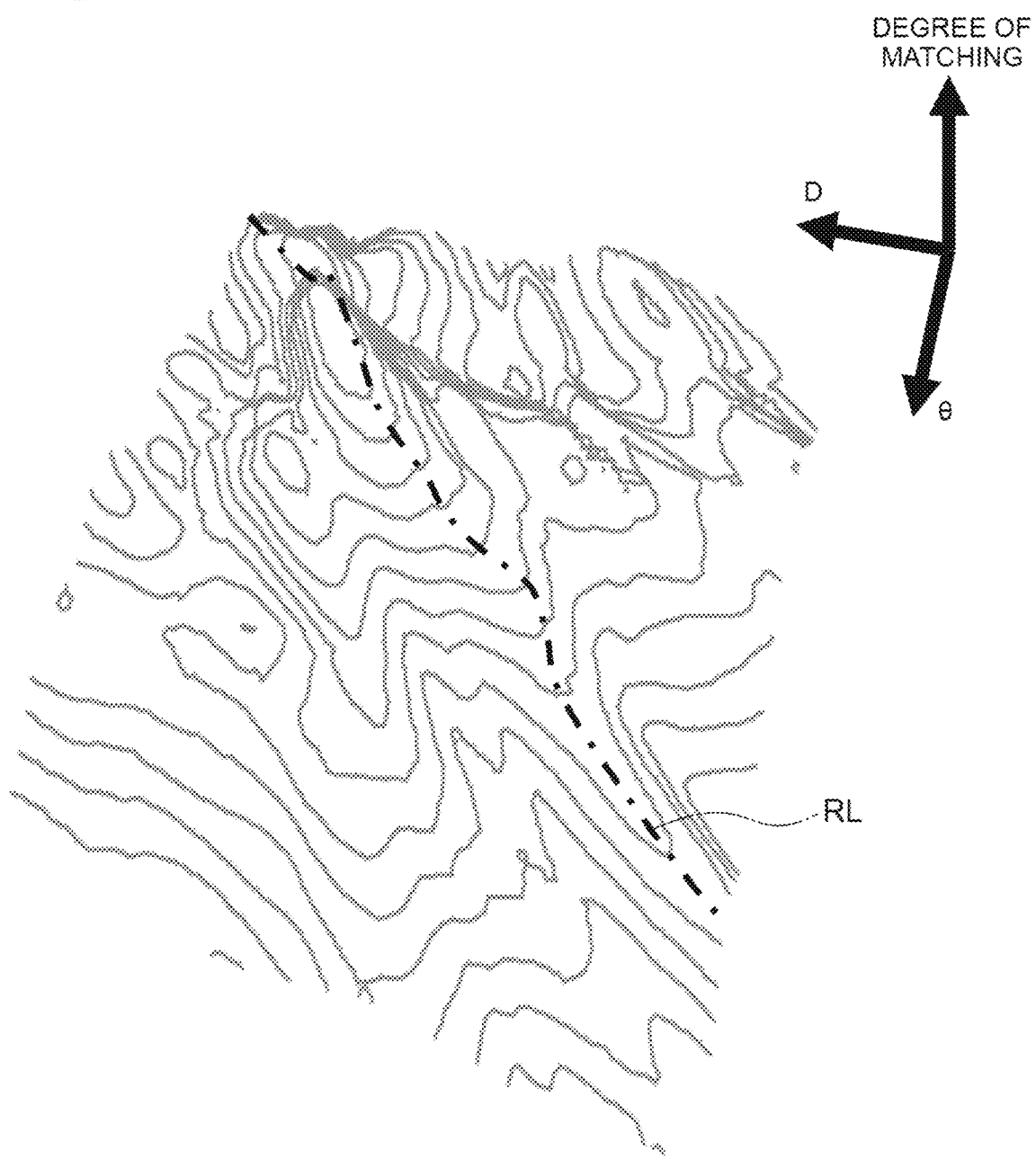
FIG. 21 is a diagram illustrating a ridge line with respect to the distribution illustrated in FIG. 20.

Here, the inventors have found that, in the distribution, the degree of matching forms a ridge type from the relationship represented by Expression (3). Therefore, the distribution of the degree of matching has a ridge line RL illustrated in FIG. 21. In FIG. 21, the contour lines of the distribution are illustrated. The local maximum value in the distribution of the degree of matching is present at any position on the ridge line RL. Therefore, the adjustment unit 106 estimates the position of the ridge line RL and intensively searches for the vicinity of the ridge line RL to quickly find the local maximum value.

Specific processing content will be described with reference to FIGS. 22 and 23. In addition, in FIGS. 22 and 23, the contour lines of the distribution are illustrated for ease of understanding. However, the adjustment unit 106 does not compute the contour lines, and the distribution of the degree of matching is not capable of being understood at an early stage.

Figure 22:
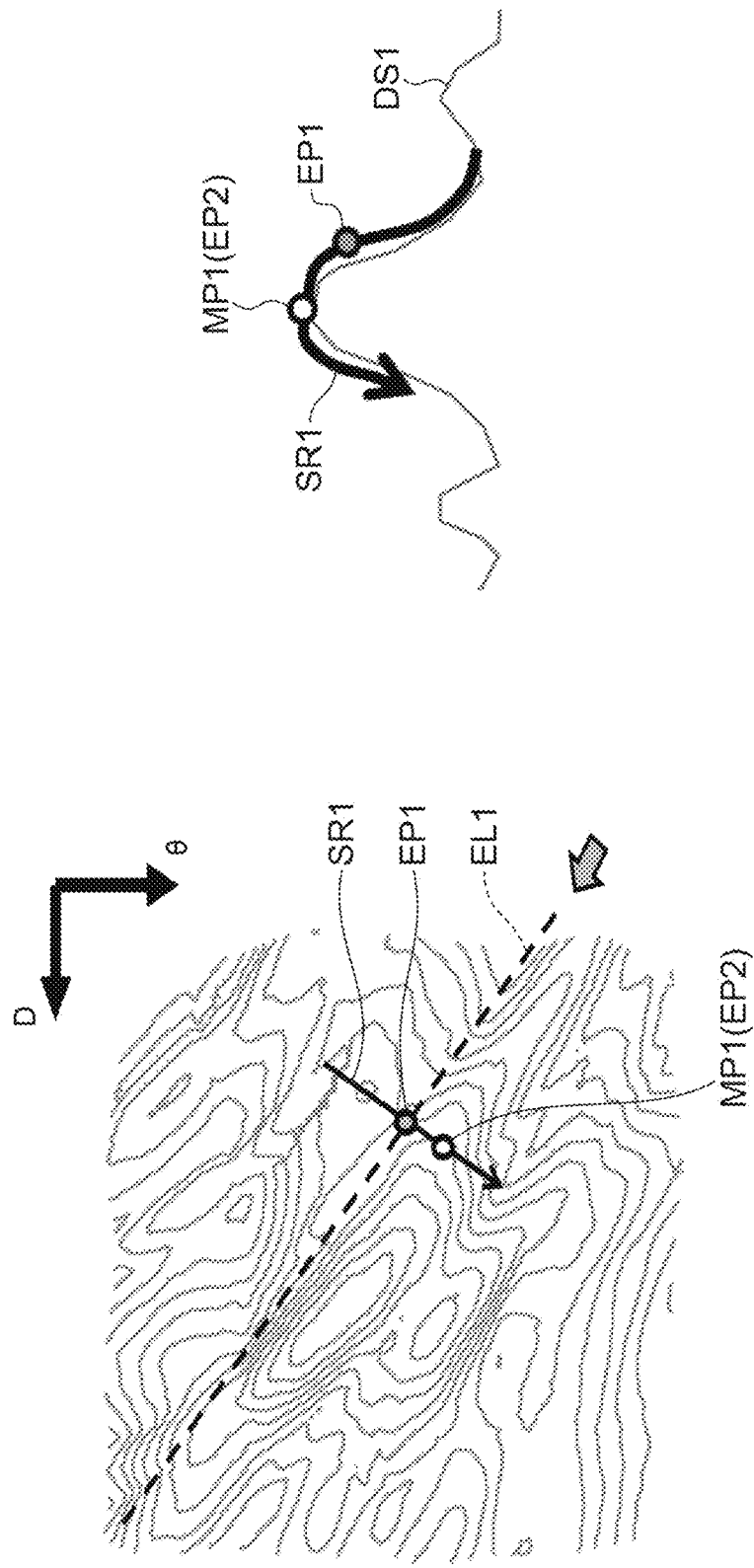
FIGS. 22(a) and 22(b) are conceptual diagrams for describing a procedure of searching for a local maximum value of the degree of matching.
Figure 23:
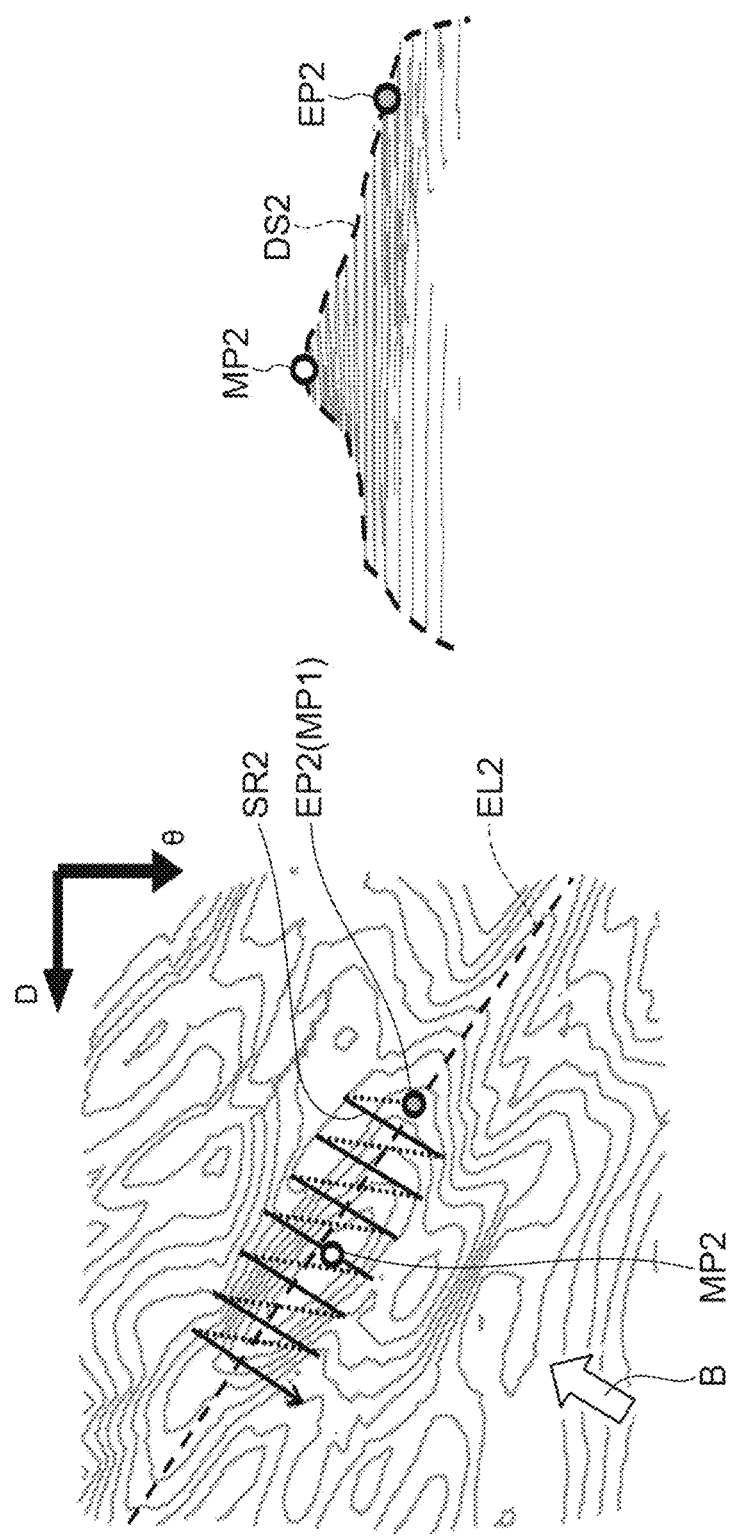
FIGS. 23(a) and 23(b) are conceptual diagrams for describing the procedure of searching for the local maximum value of the degree of matching.

First, as illustrated in FIG. 22(*a*), the adjustment unit 106 sets, as an estimated line EL1, a straight line which has the inclination represented by the above-mentioned Expression (4) and passes through (θ, D) in the projection image PF projected onto the feature plane SF at this time, which will be described below. The estimated line EL1 is a line obtained by estimating the inclination of the ridge line RL (see FIG. 21). It can be estimated that the inclination of the estimated line EL1 is along the inclination of the ridge line RL. The reason is that it is found that a variation in l due to Δθ and a variation in l due to ΔD cancel each other, as represented by Expression (3), and that the relational expression between Δθ and ΔD which cancel each other at that time is Expression (4). Further, in this stage, the inclination of the estimated line EL1 is almost equal to the inclination of the ridge line RL, but the position of the estimated line EL1 is likely to deviate from the ridge line RL.

In the early stage of computation, the estimated line EL1 passes through an initial estimated position EP1. The initial estimated position EP1 is set by the parameter based on the feature plane SF in the early stage in which the accuracy increase processing Step S70 illustrated in FIG. 14 is performed. That is, the initial estimated position EP1 is a position corresponding to the position and posture of the feature plane SF used when the position and posture are computed in Step S60.

FIG. 22(*b*) illustrates a cross-sectional shape line DS1 of the peak of the degree of matching at the initial estimated position EP1 when viewed from a direction (arrow A) in which the estimated line EL1 extends. The ridge line RL (see FIG. 21) is present at any position of the cross-sectional shape line DS1. Then, the local maximum value is present at the position of the ridge line RL. Therefore, as illustrated in FIG. 22(*a*), the adjustment unit 106 sets a search path SR1 that passes through the initial estimated position EP1 and is perpendicular to the estimated line ELL The adjustment unit 106 computes the degree of matching while changing the parameters along the search path SR1. Then, the adjustment unit 106 searches for a local maximum value MP1 in search from the search path SR1 (see also FIG. 22(*b*)). The length of the search path SR1 can be set arbitrarily. The adjustment unit 106 estimates that the ridge line RL (see FIG. 21) is present at the position of the local maximum value MP1 in search. Therefore, the adjustment unit 106 sets the local maximum value MP1 in search as an estimated position EP2 and shifts the estimated line EL1 to the estimated position EP2. In this way, the adjustment unit 106 sets a new estimated line EL2 illustrated in FIG. 23.

Then, the adjustment unit 106 sets a search path SR2 perpendicular to the estimated line EL2 and computes the degree of matching along the search path SR2. The adjustment unit 106 sets a plurality of search paths SR2 at predetermined pitches along the direction in which the estimated line EL2 extends. Therefore, the adjustment unit 106 can search for a local maximum value MP2 in all of the search paths at any position in the vicinity of the estimated line EL2. FIG. 23(*b*) illustrates a cross-sectional shape line DS2 that passes through the estimated position EP2 as viewed from a direction (arrow B) perpendicular to the estimated line EL2. In addition, the local maximum value MP2 is not strictly present on the cross-sectional shape line DS2 because it is present at a position that slightly deviates from the estimated line EL2, but is illustrated in the drawing. As illustrated in FIG. 23(*b*), when search is performed from the right side to the left side of the cross-sectional shape line DS2, the adjustment unit 106 can understand that the degree of matching reaches a peak at a certain position and is reduced after that position. Therefore, the adjustment unit 106 can determine that the degree of matching at the peak position is at the local maximum value MP2. In this way, the adjustment unit 106 specifies the local maximum value MP2 and acquires the corresponding parameters.

As described above, in the item detection device 100, the adjustment unit 106 may estimate the inclination of the ridge line RL of the ridge-type peak in a variation in the degree of matching with respect to a variation in the position and posture of the feature plane SF from the geometric relationship between the position where the surrounding image is acquired and the feature plane SF onto which the information acquired at the position is projected and may search for the local maximum value of the degree of matching on the basis of the direction (the direction in which the estimated lines EU and EL2 extend) of the inclination. In this case, the adjustment unit 106 can search for the local maximum value MP2 of the degree of matching at high speed, without changing the position and posture of the feature plane SF over all conditions to compute the degree of matching. At the same time, the adjustment unit 106 can prevent the degree of matching from reaching a false local maximum value.

In the above-described embodiment, the computing unit 104 performs the template matching between the information related to the edge portion of the front surface 61a of the pallet 61 and the actual dimension information of the front surface 61a stored in advance in the storage unit 108. In this case, the roundness (corner R) of the corner of the pallet 61 may be taken into consideration. That is, the computing unit 104 may correct the template used in the template matching on the basis of the angle formed between the viewing direction from the imaging unit 32 that acquires the surrounding image to the item and the part to be loaded and unloaded.

Figure 24:
FIG. 24(a) is a conceptual diagram illustrating a relationship between an R-chamfered portion of a corner and a viewpoint of the imaging unit.
FIG. 24(b) is a diagram illustrating a template before correction.
FIG. 24(c) is a diagram illustrating the template after correction.
Figure 24:
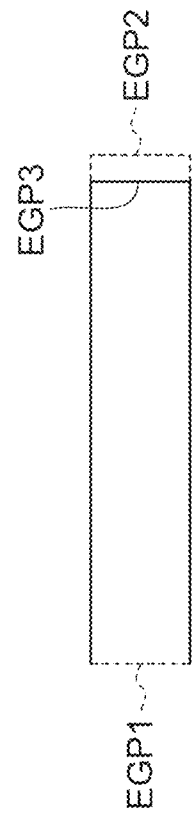
Figure 24:
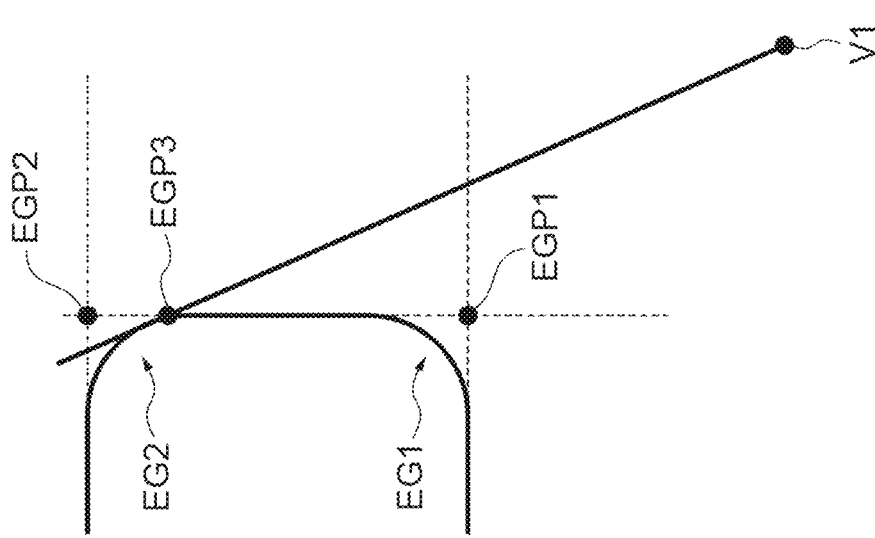

Specifically, FIG. 24(a) is a schematic diagram illustrating an aspect in which a front corner EG1 and a rear corner EG2 of the pallet 61 are viewed from the viewpoint V1. The viewpoint V1 indicates an imaging position by the imaging unit 32. Assuming that the corners EG1 and EG2 are not rounded, edge portions EGP1 and EGP2 are set at positions where the side surfaces intersect each other. In accordance with this, the edge portions EGP1 and EGP2 of the template are set as illustrated in FIG. 24(b).

Figure 25:
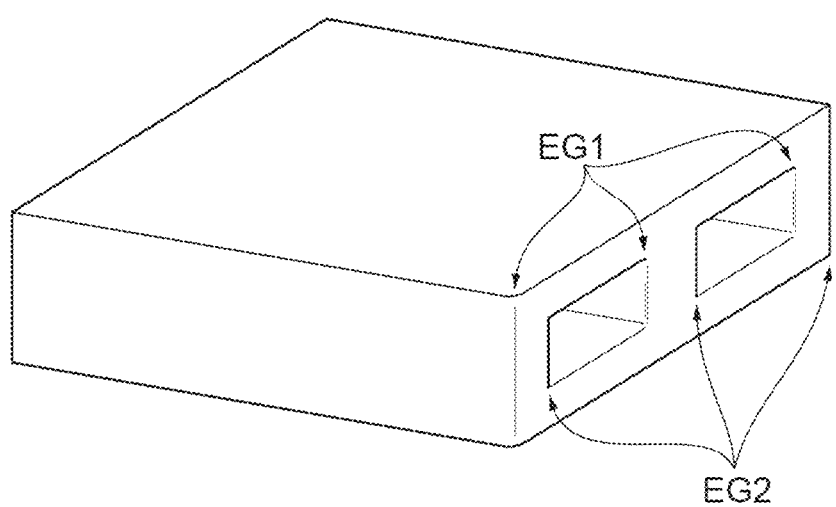
FIG. 25 is a diagram illustrating an aspect when the pallet is viewed obliquely from the imaging unit 32.

However, since the front corner EG1 is an R-chamfered portion, whose corner is chamfered, and is rounded, it is unclearly displayed in the image (see FIG. 25). In addition, since the rear corner EG2 is an R-chamfered portion and is rounded, an edge portion EGP3 that is actually captured in the image is present on the front side of the virtual edge portion EGP2. Therefore, as illustrated in FIG. 24(c), the computing unit 104 sets the front edge portion EGP1 in the template so as not to be used in the template matching. In addition, the computing unit 104 corrects the position of the rear edge portion from the edge portion EGP2 to the edge portion EGP3 in the template.

From the above, in the item detection device 100, the computing unit 104 may correct the template used in the template matching on the basis of the angle formed between the viewing direction from the imaging unit 32 that acquires the surrounding image to the item and the part to be loaded and unloaded. In this case, the computing unit 104 can perform appropriate template matching in consideration of the angle formed between the viewing direction from the imaging unit 32 to the item and the part to be loaded and unloaded.

For example, when the item detection device 100 understands the position of the shelf 60 with respect to the imaging unit 32 in advance, the feature plane setting unit 102 may omit the process of acquiring the projection image using the moving plane DF, the process of generating the three-dimensional restored shape of the shelf 60 and the pallet 61 using structure from motion [SFM], and the process of setting the feature plane SF for the front surface 60a of the shelf 60 in the restored shape using RANSAC. In this case, the feature plane setting unit 102 may compute the front surface 60a of the shelf 60 from the positional relationship between the imaging unit 32 and the shelf 60 and set the feature plane SF for the front surface 60a. For example, when the forklift 50 travels on a predetermined tracker, the item detection device 100 can understand the position of the shelf 60 with respect to the imaging unit 32 in advance.

In addition, in the above-described embodiment, the computing unit 104 computes both the position and the posture of the front surface 61a of the pallet 61. However, the computing unit 104 may compute only one of the position and the posture. For example, when it is known in advance that the posture of the pallet 61 is not rotated with respect to the shelf 60, the computing unit 104 may compute only the position. Further, when the position of the pallet 61 is known in advance, the computing unit 104 may compute only the posture.

In the above-described embodiment, a case in which the forklift 50 performs a fully automatic operation has been described. However, the item detection device 100 may perform the above-mentioned process in order to support the operation when the driver drives the forklift 50 or performs a remote operation. When the forklift 50 can switch between a manual operation by the driver and an automatic operation by the control unit 110, the forklift 50 may have an operation support mode which is a combination of the manual operation and the automatic operation according to the above-described embodiment.

In the above-described embodiment, the computing unit 104 performs the template matching to detect the pallet 61. Instead of this, the computing unit 104 may adopt other methods as long as it detects the pallet 61 using the actual dimensions of the pallet 61.

In addition, in the above-described embodiment, the reach-type forklift is given as an example of the industrial vehicle. However, the item detection device 100 may be applied to an industrial vehicle such as a forklift that can load and unload items to and from the shelf without changing the direction of the vehicle body. Further, the pallet 61 is given as an example of the item to be loaded and unloaded. However, for example, a corrugated board may be used as the item to be loaded and unloaded. Furthermore, the item detection device may be applied to an item transporting means of an automated warehouse, in addition to the industrial vehicle.

The method for adjusting the information image on the basis of the position or inclination of the front surface 61a of the pallet 61 as the part to be loaded and unloaded is not limited to the adjustment of the equation of the three-dimensional plane related to the feature plane SF when the information image is created.

A plurality of similar shape patterns SP2 (see FIG. 16(b)) may be prepared as needed. This configuration makes it possible to distinguish an object that is similar to the pallet 61 and is confusable with higher accuracy and to further prevent the confusing object from being erroneously detected as the pallet 61.

The calculation of the pixel value histogram in each of the regions E1 and E2 is not limited to the method using the bin, and each pixel value may be used for the calculation.

REFERENCE SIGNS LIST

32: imaging unit, 50: forklift (industrial vehicle), 51: vehicle body, 61: pallet (item), 61a: front surface (part to be loaded and unloaded), 100: item detection device, 101: image acquisition unit, 102: feature plane setting unit, 103: information image creation unit, 104: computing unit, 106: adjustment unit, 110: control unit.

The invention claimed is:

1. An item detection device that detects an item to be loaded and unloaded, the device comprising:
   an image acquisition unit acquiring a surrounding image obtained by capturing surroundings of the item detection device;
   an information image creation unit creating an information image, in which information related to a part to be loaded and unloaded in the item has been converted into an easily recognizable state, on the basis of the surrounding image; and
   a computing unit computing at least one of a position and a posture of the part to be loaded and unloaded on the basis of the information image,
   wherein the information image is an image obtained by projecting information acquired at a position where the surrounding image is acquired onto a plane that is set for a part of a surrounding structure that can approximate a front surface of the item
   wherein a position and a posture of the plane is known during an operation in which the plane is set, and
   wherein the plane is set during an operation of approaching an area in front of a front face of the shelf, and before entering the area, wherein the area is defined by two imaginary planes extending from opposing side faces of the shelf.

2. The item detection device according to claim 1, further comprising:
   an adjustment unit adjusting conditions for creating the information image.

3. The item detection device according to claim 1,
   wherein the information image creation unit associates dimensions corresponding to one pixel with the information image, and
   the computing unit performs computation on the basis of a relationship between the pixel of the information image and dimensions of the part to be loaded and unloaded.

4. The item detection device according to claim 1,
   wherein the computing unit performs template matching between information related to an edge portion of the part to be loaded and unloaded detected from the information image and actual dimension information of the part to be loaded and unloaded stored in advance in a storage unit.

5. The item detection device according to claim 1, further comprising:
   a feature plane setting unit setting a feature plane onto which features of the part to be loaded and unloaded in the item are projected,
   wherein the feature plane setting unit generates a three-dimensional restored shape related to the item and surroundings of the item on the basis of a plurality of the surrounding images captured at different positions and sets the feature plane on the basis of the restored shape, and
   the information image creation unit creates the information image using the feature plane.

6. The item detection device according to claim 5,
   wherein the feature plane setting unit sets the feature plane using a moving plane that moves in synchronization with movement of a place where the surrounding image is captured.

7. The item detection device according to claim 1,
   wherein the surrounding image is an image acquired by a fisheye camera or a wide-angle camera.

8. The item detection device according to claim 3,
   wherein the item is a pallet, the information image has a pallet candidate portion indicating a region in which the pallet is likely to be present, and
   the computing unit has a shape pattern having a first region and a second region that imitate a shape of the pallet, applies the shape pattern to each of the pallet candidate portions, and calculates a degree of uniformity indicating a degree to which the first region and the second region are uniform regions from pixel value histograms in the first region and the second region.

9. The item detection device according to claim 8,
   wherein the computing unit calculates the degree of uniformity on the basis of a sum of the number of pixels having pixel values in peak neighborhood regions in the pixel value histograms with respect to the total number of pixels in the first region and the second region.

10. The item detection device according to claim 8,
    wherein the computing unit further has a similar shape pattern that imitates an object similar to the pallet and identifies the pallet from the pallet candidate portion using the shape pattern and the similar shape pattern.

11. The item detection device according to claim 8,
    wherein the computing unit sets the pallet candidate portion, the first region, and the second region in a rectangular shape and uses an integral image to calculate the pixel value histograms.

12. The item detection device according to claim 2,
    wherein, from a geometric relationship between a position where the surrounding image is acquired and a projection surface onto which information acquired at the position is projected, the adjustment unit estimates an inclination of a ridge line of a ridge-type peak in a variation in a degree of matching with respect to a variation in a position and a posture of the projection surface, and searches for a local maximum value of the degree of matching on the basis of a direction of the inclination.

13. The item detection device according to claim 4,
    wherein the computing unit corrects a template used in the template matching on the basis of an angle formed between a viewing direction from an imaging unit that acquires the surrounding image to the item and the part to be loaded and unloaded.

14. An item detection method that detects an item to be loaded and unloaded, the method comprising:
    an image acquisition step of acquiring a surrounding image obtained by capturing surroundings;
    an information image creation step of creating an information image, in which information related to a part to be loaded and unloaded in the item has been converted into an easily recognizable state, on the basis of the surrounding image; and
    a computing step of computing at least one of a position and a posture of the part to be loaded and unloaded on the basis of the information image,
    wherein the information image is an image obtained by projecting information acquired at a position where the surrounding image is acquired onto a plane that is set for a part of a surrounding structure that can approximate a front surface of the item,
    wherein a position and a posture of the plane is known during an operation in which the plane is set, and
    wherein the plane is set during an operation of approaching an area in front of a front face of the shelf, and before entering the area, wherein the area is defined by two imaginary planes extending from opposing side faces of the shelf.

15. An industrial vehicle comprising:

a vehicle body;

an imaging unit capturing an image of surroundings of the vehicle body; and a control unit performing control to detect an item to be loaded and unloaded on the basis of the image acquired by the imaging unit, wherein the control unit includes:

an image acquisition unit acquiring a surrounding image obtained by capturing the surroundings of the vehicle body from the imaging unit;

an information image creation unit creating an information image, in which information related to a part to be loaded and unloaded in the item has been converted into an easily recognizable state, on the basis of the surrounding image; and a computing unit computing at least one of a position and a posture of the part to be loaded and unloaded on the basis of the information image, wherein the information image is an image obtained by projecting information acquired at a position where the surrounding image is acquired onto a plane that is set for a part of a surrounding structure that can approximate a front surface of the item, wherein a position and a posture of the plane is known during an operation in which the plane is set, and wherein the plane is set during an operation of approaching an area in front of a front face of the shelf, and before entering the area, wherein the area is defined by two imaginary planes extending from opposing side faces of the shelf.

16. The industrial vehicle according to claim 15, wherein the control unit controls the position or the posture of the vehicle body on the basis of information related to at least one of a position and a posture of the item.

* * * * *